United States Patent [19]
Orikasa et al.

[11] Patent Number: 5,930,895
[45] Date of Patent: *Aug. 3, 1999

[54] PROCESS FOR PRODUCING AN INK JET RECORDING HEAD

[75] Inventors: Tsuyoshi Orikasa, Kasukabe; Fumio Ichikawa, Kamakura; Kazuaki Masuda; Kunihiko Maeoka, both of Kawasaki; Takashi Watanabe, Yokohama; Osamu Sato, Kawasaki; Akira Goto, Yokohama, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/821,645

[22] Filed: Mar. 20, 1997

Related U.S. Application Data

[62] Division of application No. 08/310,806, Sep. 22, 1994, Pat. No. 5,657,539, which is a continuation of application No. 07/963,906, Oct. 20, 1992, abandoned.

[30] Foreign Application Priority Data

| Oct. 22, 1991 | [JP] | Japan | 3-273884 |
| Nov. 1, 1991 | [JP] | Japan | 3-287828 |
| Nov. 1, 1991 | [JP] | Japan | 3-287829 |
| Nov. 1, 1991 | [JP] | Japan | 3-287836 |
| Nov. 6, 1991 | [JP] | Japan | 3-290081 |

[51] Int. Cl.⁶ .................................................. B41J 2/16
[52] U.S. Cl. ........................ 29/890.1; 29/464; 347/47
[58] Field of Search ............................ 347/47, 63, 65; 29/611, 890.1, 464

[56] References Cited

U.S. PATENT DOCUMENTS 4,313,124  1/1982  Hara.
4,345,262  8/1982  Shirato et al..

(List continued on next page.)

FOREIGN PATENT DOCUMENTS

| 0367541 | 5/1990 | European Pat. Off.. |
| 0389296 | 9/1990 | European Pat. Off.. |
| 0419193 | 3/1991 | European Pat. Off.. |

(List continued on next page.)

OTHER PUBLICATIONS

IBM Techn. Discl. Bulletin, "Manufacturing Nozzles, Charging Plates, and Deflection Assemblies into a Prealigned System", vol. 17, No. 5, pp. 1525–1526 (Oct. 1974).

Research Disclosure, "Process to Fabricate Thermal Transfer Print Head to Provide a Conformable Head", Mar. 1992, No. 335, Kenneth Mason Publications, Ltd., England.

Mark C. Huth et al. "CIP and Machine Vision in the Production of Thermal Inkjet Printers", 1266 Hewlett–Packard Journal, Oct. 1988, pp. 91–98 Official Search Report For Eur. Pat. Appln. No. 92118029.5.

*Primary Examiner*—P. W. Echols
*Attorney, Agent, or Firm*—Fitzpatrick, Cella, Harper & Scinto

[57] ABSTRACT

An ink jet recording head is produced by forming in a first substrate a plurality of orifices for ejecting an ink droplet and a reference object for registration; forming in a second substrate ejection energy generating elements for supplying energy for ejecting the ink placed in liquid passages communicating with the orifices; and joining the first substrate and the second substrate together on the basis of the reference object for registration.

7 Claims, 38 Drawing Sheets

U.S. PATENT DOCUMENTS

| | | |
|---|---|---|
| 4,459,600 | 7/1984 | Sato et al. . |
| 4,463,359 | 7/1984 | Ayata et al. . |
| 4,558,333 | 12/1985 | Sugitani et al. . |
| 4,608,577 | 8/1986 | Hori . |
| 4,680,859 | 7/1987 | Johnson ................................. 29/611 |
| 4,723,129 | 2/1988 | Endo et al. . |
| 4,740,796 | 4/1988 | Endo et al. . |
| 4,789,425 | 12/1988 | Drake et al. . |
| 4,809,428 | 3/1989 | Aden et al. ............................ 29/611 |
| 4,914,562 | 4/1990 | Abe et al. ............................. 347/63 |
| 4,953,287 | 9/1990 | West et al. ............................ 29/611 |
| 5,063,655 | 11/1991 | Lamey et al. ......................... 29/611 |
| 5,208,604 | 5/1993 | Watanabe et al. . |

FOREIGN PATENT DOCUMENTS

| | | |
|---|---|---|
| 54-56847 | 5/1979 | Japan . |
| 54-59936 | 5/1979 | Japan . |
| 57-181873 | 11/1982 | Japan . |
| 58-217368 | 12/1983 | Japan . |
| 59-123670 | 7/1984 | Japan . |
| 59-138461 | 8/1984 | Japan . |
| 60-71260 | 4/1985 | Japan . |
| 60-174258 | 10/1985 | Japan . |
| 63-202455 | 8/1988 | Japan . |
| 1-108056 | 4/1989 | Japan . |
| 2-2003 | 1/1990 | Japan ................................... 347/47 |
| 3-121960 | 4/1991 | Japan . |
| 3-121854 | 5/1991 | Japan . | a : POSITION OF ASSEMBLY OPERATION $\Delta X_3 = Xb - Xc$ $\Delta X_3$: AMOUNT OF DEVIATION OF THE OPTICAL AXIS t: THICKNESS OF THE TOP PLATE MEMBER AMOUNT OF MOVEMENT
OF THE ORIFICE
$\Delta x_m = x_1 - x_2 + \Delta x_3$

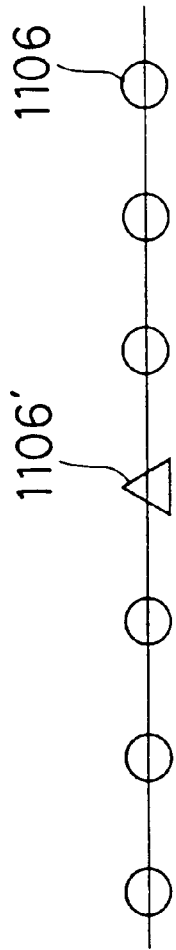
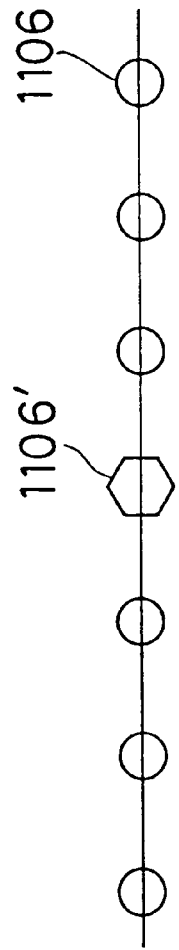
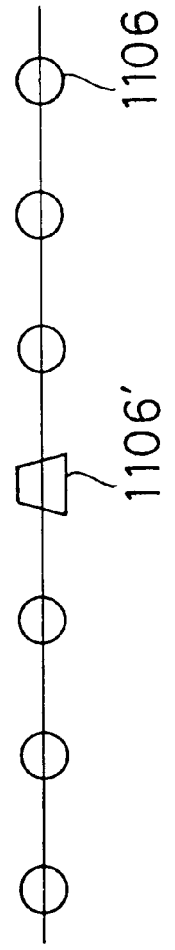
FIG.22A
FIG.22B
FIG.22C

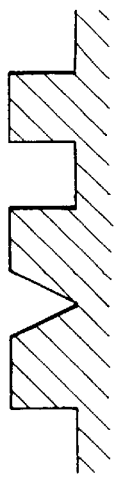 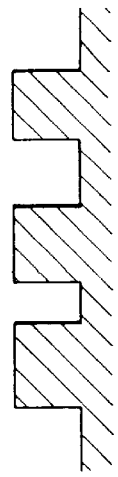 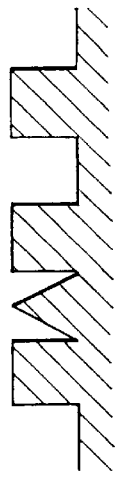 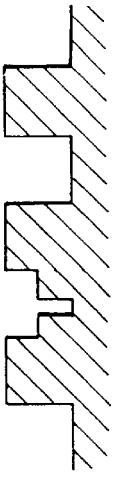
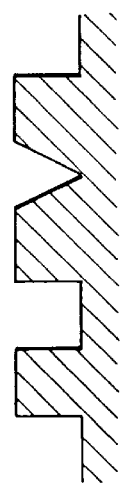 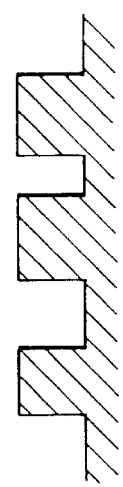 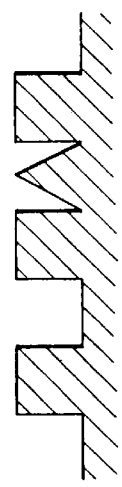 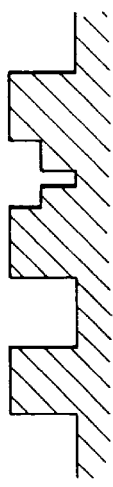
FIG. 28A  FIG. 28B  FIG. 28C  FIG. 28D

PROCESS FOR PRODUCING AN INK JET RECORDING HEAD

This application is a division of application Ser. No. 08/310,806, filed Sep. 22, 1994, U.S. Pat. No. 5,657,539 which is a continuation of application Ser. No. 07/963,906, filed Oct. 20, 1992, now abandoned.

BACKGROUND OF THE INVENTION

1. Field of the Invention

The present invention relates to a process for producing an ink jet recording head and more particularly to a process for producing orifices in the ink jet recording head.

2. Description of the Prior Art

Ink jet recording is a non-impact recording method which is almost free from noise generation during recording, which is capable of high-speed recording, and which enables recording without requiring any special operations for fixing onto ordinary paper. Of the currently known various recording methods, this method is very useful. Wide varieties of proposals have been put forward for this method and improvements have been applied to it. These efforts have led to some commercially available products, whereas some ideas are still on the way to commercialization.

Ink jet recording is one method in which ink droplets are ejected by various mechanisms and are deposited on a recording medium such as a paper, so as to perform recording.

A novel method relating to ink jet recording was proposed in Japanese Patent Application Laying-open No. 59936/1979, and its fundamental principle is outlined as follows: Thermal pulses as information signals are applied to the ink introduced in an ink passage that can accommodate the ink. As a result, the ink generates a vapor bubble and produces an actuating force during its growth and contraction. This force causes the ink to be ejected as the droplets from orifices communicating with the ink passage, whereafter the droplets are deposited on a recording medium to perform recording.

This method provides the orifices in a high-density, multi-array layout which can easily fit for high-speed recording as well as color recording. In addition, the apparatus employed in this method is simpler in construction than conventional apparatuses. Hence, a recording head can be reduced in size as a whole and is suitable for mass-production. This method can also easily provide a wide-range recording head in which many orifices are arranged by taking advantage of remarkable IC technologies and microscopic processing techniques and of an increase of reliabilities in the semiconductor field. Thus, the method is broad in the scope of applications.

As shown in FIG. 1, the ink jet recording head for use in ink jet recording is composed of a first substrate 101 (hereinafter to be referred to as a heater board) equipped with electro-thermal converting elements and a second substrate 102 which has grooves for forming a liquid chamber accommodating the ink and ink passages by joining the first substrate 101 to the second substrate 102. The second substrate 102 integrally has an orifice plate 104 which includes ink ejection outlets 109, that is, orifices, communicating with the ink passages (the second substrate will hereinafter to be referred to as a grooved top plate).

The heater board 101 is adhered and fixed to a supporting base plate 103 with the use of an adhesive. The grooved top plate 102 is bonded with the heater board 101 in such a manner that the electro-thermal converting elements disposed on the heater board 101 register with the grooves for ink passages formed in the grooved top plate 102. The orifice plate 104 of the grooved top plate 102 is disposed so as to project forward and downward like an apron from a front end surface of the supporting base plate 103.

Grooves 103A are formed in a part of the area of the supporting base plate 103 which is covered by the orifice plate 104, more specifically, in the area that is covered by right and left end portions of the orifice plate 104.

The ink is supplied from an ink feed member 105 through an ink feed port 102a provided in an upper portion of the grooved top plate 102. The ink feed member 105 has a projecting bar and is fixed to the supporting base plate 103 by inserting this projecting bar into a through hole provided in the supporting base plate 103 and thermally caulking the through hole.

The gaps 110a and 110b, between the ink feed member 105 and the heater board 101, and, between the ink feed member 105 and the grooved top plate 102, as well as a joining area with a tiny gap between the orifice plate 104 and the front end surface of the supporting base plate 103 which is to be sealed with an adhesive, constitute an adhesion space which is filled with a sealing compound from above the ink feed member 105 through the grooves 103A.

The ink jet recording head as described above has several problems with production as indicated below.

1) In FIG. 1, the joining area between the orifice plate 104 and the front end surface of the supporting base plate 103 has so small a gap that the sealing compound often fails to reach the gap, particularly, its central portion, in a sufficient amount. To avoid this problem, it has been a customary practice to lower the viscosity of the sealing compound. The lowering of its viscosity, however, causes the sealing compound to go out of holes provided in the supporting base plate 103, i.e. a mounting hole for a presser spring to be mounted to provide a close contact between the second substrate 102 with the ink passages and the heater board 101, and a hole for insertion of an ink supply pipe of the ink feed member 105 for suppling the ink from an ink tank, as well as a gap in a posterior portion of the ink feed member 105. As a result, the amount of the sealing compound may be insufficient. Moreover, a protrusion which will serve as a reference object when the ink jet recording head is mounted on the carriage may be coated with the sealing compound, thus deteriorating the accuracy and precision of mounting, thereby, for instance, causing a recorded line to be curved. Furthermore, the sealing compound may invade the orifices, causing the ink not to be ejected.

2) In bringing the electro-thermal converting elements and the orifices into registration, it has been a customary practice to register them manually using a specialized jig while alternately observing the electro-thermal converting elements and the orifices under a metallurgical microscope.

This manual adjustment by an operator for registration of the electro-thermal converting elements and the orifices has the following problems:

a) Variations in the manual work cause variations in the accuracy and precision of adjustment.

b) Visual measurements and manual operations of the jig for repeated use take much time for adjustment.

c) The operator suffers from asthenopia due to the long-term visual measurements, and ultraviolet irradiation for setting the adhesive when fixing the members after registration of the orifices and the electro-thermal converting elements.

To solve these problems, an apparatus has been proposed for performing registration of the orifices without relying on manual work. According to this apparatus, the positions of the electro-thermal converting elements and the positions of the orifices are confirmed with an ITV camera via an optical system, and information on the positions of them are converted into image signals, which are transmitted to an image processing unit. In the image processing unit, the image signals of the two members are processed and their positional coordinates are calculated. On the basis of the calculated results, the difference in position is determined, and the top plate is moved so that the positions of the electro-thermal converting elements and the positions of the orifices are brought into registration with each other.

This conventional apparatus still involves the following problems: Generally, the orifices formed in the orifice plate integral with the top plate and the grooves for the ink passages of the top plate are arranged in plural numbers with similar shapes. When these members are to be brought into registration in joining the top plate with the heater board while observing the orifices with the ITV camera, the determinations of the orifices to be registered have been impossible with a conventional image processing unit. Consequently, the electro-thermal converting elements and the orifices are generally out of register the orifice may be positioned at a place where the electro-thermal converting elements are not located, or no orifices may be positioned at a place where the electro-thermal converting elements are located. Such a failure in the accurate registration of the orifices and the electro-thermal converting elements will adversely affect ink ejection performance, and would become the cause of the ink not being ejected in the worst case. Particularly, when the ink jet recording head becomes more accurate, more precise and speedier, the orifices and the grooves for ink passages become micro-sized. This requires the exact registration between the orifices and the electro-thermal converting elements as an indispensable task for the production of the ink jet recording head.

3) When the orifices of the recording head are formed, it has been a common practice to use a laser capable of emitting an ultraviolet radiation such as a fourfold wave of an excimer laser or a YAG laser. The formation of the orifices in this case has been carried out in two roughly manners as follows.

a) First, the orifice plate for forming the orifices is joined to an end surface of the top plate where the groove for the ink passages has been formed. Then, the orifices are formed by irradiating a laser beam onto the orifice plate via a mask. The groove for the ink passages is open at the end surface of the top plate, and the formation of the orifices is performed so that the orifices will communicate with the opening. The orifice plate may be formed of a resin film or the like. During the formation of the orifices, the position of the orifice to be formed and the position of the groove for the ink passages are brought into registration.

The above-mentioned procedure is shown in FIG. 2. In this drawing, the reference numeral 301 denotes an ultraviolet laser apparatus, 302 a laser beam emitted by the ultraviolet laser apparatus 301, 303 a lens system, 304 a projection mask having aluminum evaporation-deposited thereon which has all or some of the patterns of the orifices and which can be shielded to the laser beam 302, 305 a top plate provided with a groove for the ink passages and a groove for a common liquid chamber, 305A an orifice plate, and 305B a support member for supporting the top plate 305. A movable stage 306 moves the support member 305B horizontally, thereby moving the top plate 305 supported thereon, and eventually adjusting the position of the groove for the ink passages with respect to the laser beams.

Details of the ink jet recording head body in which the orifices have been formed in accordance with such a construction are illustrated in FIG. 3.

FIG. 3 is a schematic sectional view of the recording head body.

In FIG. 3, 408 is a heater board with an electro-thermal converting element patterned, and 411 is an orifice formed in an orifice plate 405A. The reference numeral 414 designates an ink passage, and 415 is an electro-thermal converting element provided in correspondence to the ink passage 414. The ink passage 414 is composed of the groove for the ink passage and the heater board.

b) Alternatively, an orifice is formed by irradiating an ultraviolet laser beam from the side where the groove for the ink passage 414 has been formed, onto a member having the top plate 405 and the orifice plate 405A formed integrally. This procedure is illustrated in FIG. 4.

FIG. 4 shows a manner in which an ultraviolet laser beam is irradiated from the ink passage side onto the orifice plate formed integrally with the top plate, thereby forming an orifice. The same members as shown in FIG. 2 are indicated by the same reference numerals.

The procedure for forming the orifice as mentioned above has been performed in the following manner: A laser beam that has passed the projection mask is irradiated onto the orifice plate to form an orifice. For registration of the laser beam, the shape of the groove for the ink passage is incorporated as image informations by means of an ITV camera, and the position of the groove is confirmed by recognizing the image. Then, the position of the groove for the ink passage is brought into registration via the projection mask with the position where the laser beam is to be irradiated.

A third problem with the laser beam machining for forming orifices is as follows: Since there are a plurality of the grooves for the ink passages with the same shape, whichever the above-mentioned methods may be employed, it has been difficult to determine by image processing which of the grooves for ink passages should be registered with the laser beam.

For example, it has been conventionally used to form the orifices after counting the number of grooves for the ink passages from the end groove for the ink passage to the aimed groove for the ink passage, or to form the orifice after registering the top plate with a movable stage, and then irradiating the laser beam onto the orifice plate.

The former method, however, takes a wasteful time for the formation of the orifices because the number of grooves for the ink passages has to be counted from the end grooves for the ink passages to the aimed groove for the ink passage each time the orifice is to be formed.

On the other hand, according to the latter method, if the dimensions of the top plate are varied, the dimensions of the top plate mounting panel have to be varied with response to dimensional variation, or data on how much the movable stage should be moved must be incorporated again into the image recognition apparatus. Thus, the steps for laser beam machining become complicated.

4) Fourthly, there has been the problem that when orifices are to be formed by laser beam machining, their shapes may be different depending on the positions of the orifices arranged.

As shown in FIG. 5, a laser beam emitted by a laser oscillation apparatus (not shown) is divided into laser beams $L_1$ to $L_n$ indicated by a plurality of thick arrows as shown in FIG. 5 that have passed the mask.

An optical axis $616_k$ (indicated by a one dot chain line in FIG. 5) of the laser beam $L_k$ in the neighborhood of the center of the laser beam, coincides with an axis $620_k$ of the orifice $611_k$, which is a symmetrical axis for the shape of the orifice, but the intensity of the laser beam becomes weaker at a peripheral portion apart from the center of the laser beam. Therefore, when the orifice plate 610 is formed, the shape of the orifice formed is such that its end heads toward the inside where the intensity of the laser beam is strong.

This trend is noticeable at orifices $611_1$ and $611_n$ at both end portions. The axes of ink ejection outlets $620_1$ and $620_n$ do not coincide with the optical axes $616_1$ and $616_n$ of the laser beams $L_1$ and $L_n$ and incline toward the center of the orifice. As a result, ink droplets are ejected more inwardly than the direction for ejecting ink droplets in the vicinity of the center of the laser beam. Furthermore, the orifices $611_{k-1}$, $611_k$, and $611_{k+1}$ in the neighborhood of the central axis of the laser beam, and the orifices $611_1$, $611_n$ at peripheral portions of the laser beam are different in the direction of laser beam machining and have different shapes. This also results in the deterioration of the grade of recorded images.

To solve the above-described problems, the following methods have been adopted:

The orifice plate is machined only with use of laser beam in the neighborhood of the center of the laser beam to form an orifice. The orifice plate is laser beam machined in such an manner that an optical system thought out so that the intensity of the laser beam at peripheral portions of the laser beam coincides with the intensity in the neighborhood of the center of the laser beam, thereby to form an orifice. According to the method for forming the orifice using only the laser beam in the neighborhood of the center of the laser beam, however, the area where the orifice is formed is narrow, thus making it impossible to form a number of orifices at a time. The formation of multiple orifices requires that the area of laser beam machining be varied frequently, and the orifice plate be machined for many times. Consequently, the machining time is prolonged, and the throughput is decreased. At each laser beam machining, moreover, there tends to be large variations in the positions, shapes and diameters of the orifices, thus lowering the accuracy and precision of machining.

The method of working out such an optical system that the intensity of the laser beam is the same in the vicinity of the center of the laser beam and at the peripheral portions of the laser beam has the following disadvantages: Since the construction of the optical system is complicated, many lenses are used, thus making their adjustment difficult and decreasing the throughput. Also, the apparatus is separately needed to adjust the optical system, thereby rising the costs of the orifice formation.

5) Laser beam machining for orifice formation also has the following problems:

When a workpiece such as an ink jet recording head is to be laser beam machined to form orifices, the formation of numerous orifices takes much time such a construction in which a laser beam is converged to one point to form orifices one by one. Particularly, much time is required for registration intended for accurate laser beam machining of an orifice, thus lowering remarkably the operational efficiency. To avoid these disadvantages, a laser beam machining apparatus is conceivable in which a desired number of orifices can be perforated in the work, or in which the position of the orifice is measured, and its position can be corrected on the basis of the results measured. In such an apparatus, the orifices with the intended diameter or area are perforated under the conditions where the laser power and/or the irradiation time with response to the thickness of the orifice plate are setted in advance.

In the laser beam machining apparatus as mentioned above, however, it may be difficult to perforate orifices with the same diameter or area under the same conditions for long periods of time, owing to variations in the thickness of the orifice plate according to lot differences, changes in the laser power due to changes with time in the laser oscillator and so forth. Hence, regular sampling may become necessary to reset the laser power and/or the irradiation time. This resetting step may lower the operating efficiency of the apparatus. In addition, whenever the lot of the top plate is changed and the interval of the grooves is changed, resetting must be done manually. When many top plates are to be formed from one lot, in particular, an operational step for setting the laser power for each top plate will become necessary. Such preparatory tasks for the apparatus are laborious, thereby lowering the operating efficiency.

SUMMARY OF THE INVENTIONS

In a first aspect of the present invention, there is provided a process for producing an ink jet recording head for ejecting an ink, the process comprising the steps of:

joining together a first substrate and a second substrate, the first substrate having ejection energy generating elements for supplying energy for ejecting an ink, the second substrate integrally having an orifice plate having orifices formed therein for ejecting an ink, a front plate member provided integrally with the orifice plate, and grooves and projections for constituting ink passages communicating with the orifices by being joined to the first substrate;

joining a part of a joining member composed of the first substrate and the second substrate to a supporting base plate having grooves in a part of the surface to be joined to the joining product, the grooves extending beyond the surface, thereby covering a front surface of the supporting base plate by a part of the front plate member of the second substrate; and filling a sealing compound into gaps between the front plate member and the front surface of the supporting base plate through the grooves.

Here, the grooves may extend radially from the neighborhood of the center of the orifice plate.

The ejection energy generating elements may generate thermal energy to generate a bubble and the ink may be ejected accompanied by generating the bubble.

The ink jet recording head may accommodate ink to be ejected from the orifices.

In a second aspect of the present invention, there is provided a process for producing an ink jet recording head comprising a first substrate provided with a plurality of orifices for ejecting an ink, and a second substrate combined with the first substrate and provided with ejection energy generating elements for supplying energy for ejecting the ink, the process comprising the steps of:

detecting a reference object for registration which is provided in the first substrate and which is used when the second substrate is combined with the first substrate; and joining together the first substrate and the second substrate with reference to the detected reference object for registration.

Here, the reference object for registration may be some of the plurality of orifices, and the orifice as the reference object for registration may be different in shape from the other orifices.

The ejection energy generating elements may generate thermal energy to generated a bubble and the ink may be ejected accompanied by generating the bubble.

The ink jet recording head may accommodate ink to be ejected from the orifices.

The reference object for registration may be provided in the neighborhood of the plurality of orifices.

In a third aspect of the present invention, there is provided a process for producing an ink jet recording head for ejecting an ink, the process comprising the steps of:

providing an orifice plate constituting the ink jet recording head; and irradiating laser beams sequentially which are symmetrical each other in intensity distribution thereof onto same portion of the orifice plate which corresponds to an aimed ink passage so as to form the orifice.

Here, the laser beams may be excimer laser beams.

The recording head may generate a bubble by utilizing thermal energy and may eject the ink accompanied by generation of the bubble.

The ink jet recording head may accommodate ink to be ejected from the orifices.

In a fourth aspect of the present invention, there is provided a process for producing an ink jet recording head for ejecting an ink, the process comprising the steps of:

irradiating a laser beam onto an orifice plate to form an orifice;

observing the diameter or area of the orifice; and controlling the power and/or the irradiation time of the laser beam on the basis of the diameter or area observed.

Here, the recording head may generate a bubble by utilizing thermal energy and may eject the ink accompanied by generation of the bubble.

The ink jet recording head may accommodate ink to be ejected from the orifices.

An object of the present invention is to provide a process for producing an ink jet recording head which enables a sealing compound to be filled satisfactorily into a joining area between the respective members.

Another object of the present invention is to provide a process for producing an ink jet recording head which permits the accurate registration between the orifices and the electro-thermal recording elements.

Still another object of the present invention is to provide a process for producing an ink jet recording head which can machine the orifice plate in a short period of time and whose production steps are simplified.

A further object of the present invention is to provide a process for producing an ink jet recording head which requires a shortened time for machining the orifice plate, which is high in the accuracy and precision of machining and which can form orifices with a satisfactory shape.

A still further object of the present invention is to provide a process for producing an ink jet recording head which is simplified in the operating steps and which can form orifices with the same diameter in a short period of time.

BRIEF DESCRIPTION OF THE DRAWINGS

FIGS. 22A to 22C are front views of another orifice plate of the ink jet recording head in accordance with the present invention.

FIGS. 28A to 28D are sectional views showing the shapes of various reference objects for registration provided in another top plate in accordance with the embodiment of the present invention.

DESCRIPTION OF THE PREFERRED EMBODIMENTS

Embodiment 1

Figure 6:
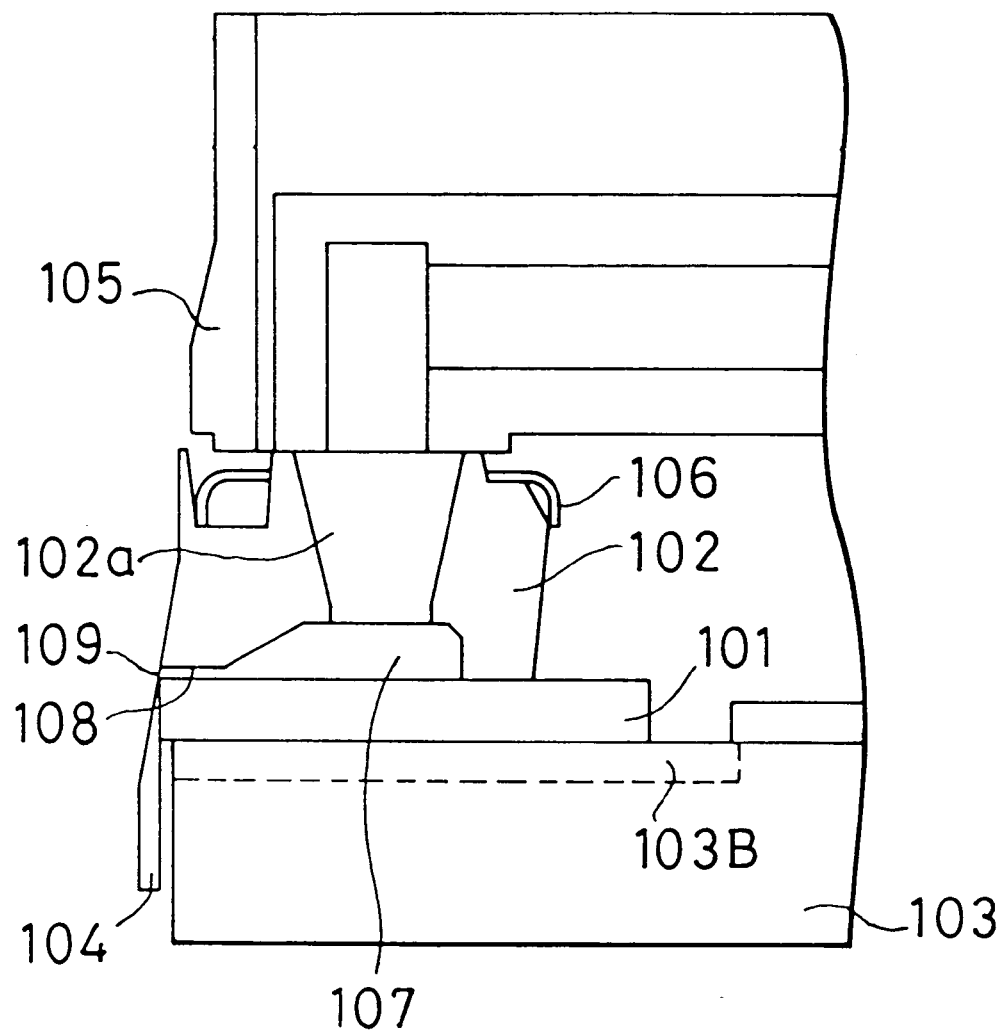
FIG. 6 is a simplified sectional view showing an embodiment of the ink jet recording head in accordance with the present invention.

FIG. 6 is a simplified sectional view showing an embodiment of the ink jet recording head in accordance with the present invention.

Figure 7:
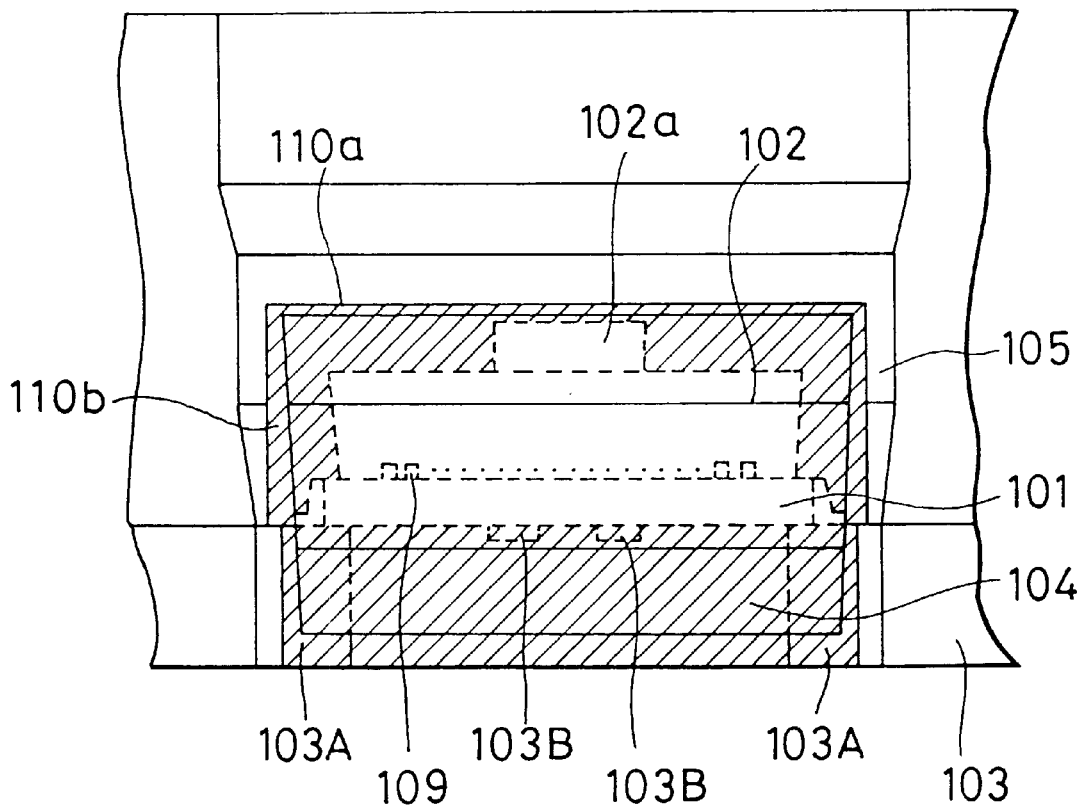
FIG. 7 is a simplified front view showing the ink ejection outlet side as shown in FIG. 6.

FIG. 7 is a simplified front view of the orifice side of the ink jet recording head as shown in FIG. 6.

Figure 8:
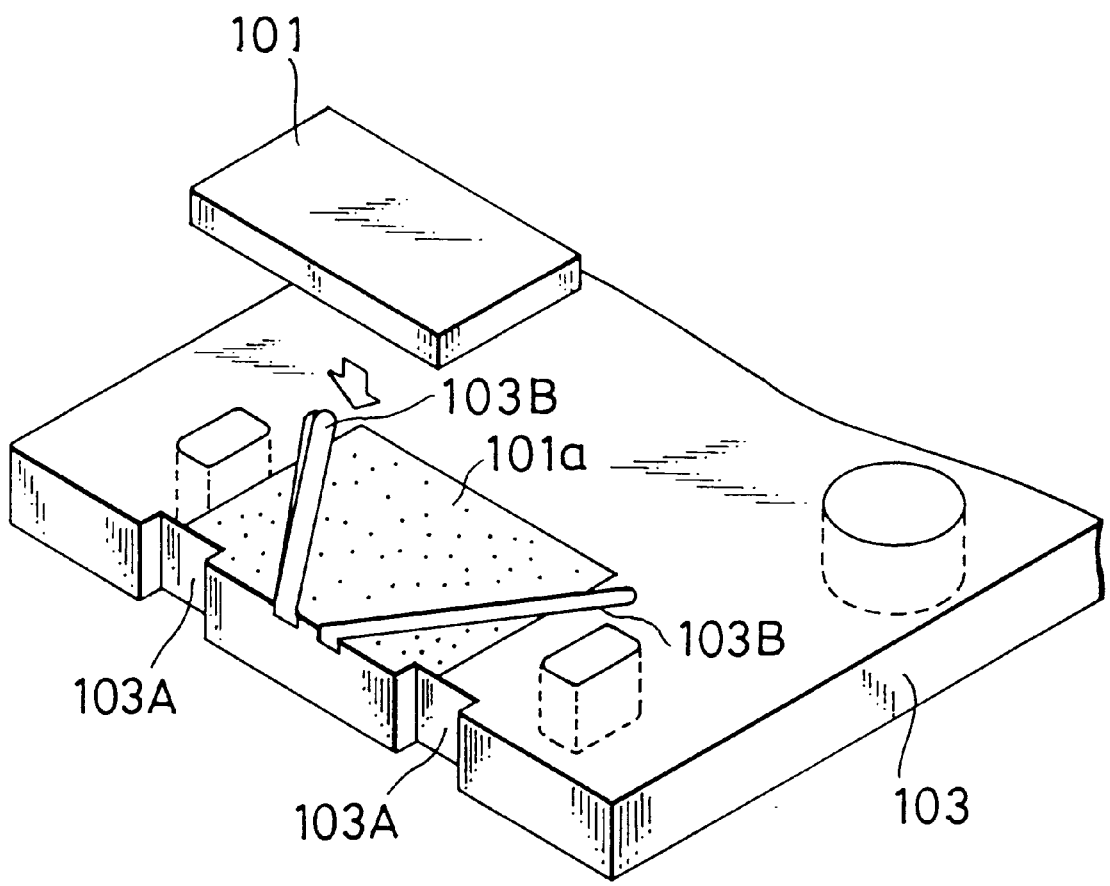
FIG. 8 is a perspective view showing an example of a supporting base plate constituting the ink jet recording head in accordance with the present invention.
Figure 9A:
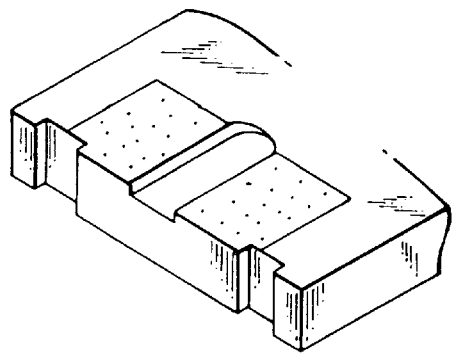
FIGS. 9A to 9D are perspective views showing other examples of a supporting base plate constituting the ink jet recording head in accordance with the present invention.
Figure 9C:
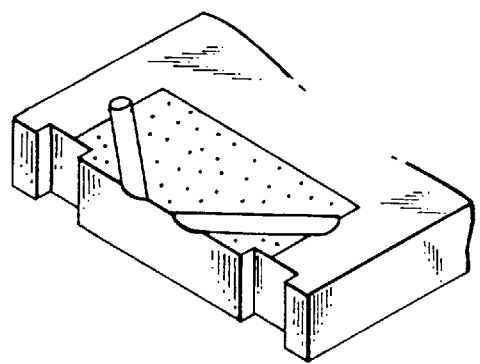
Figure 9B:
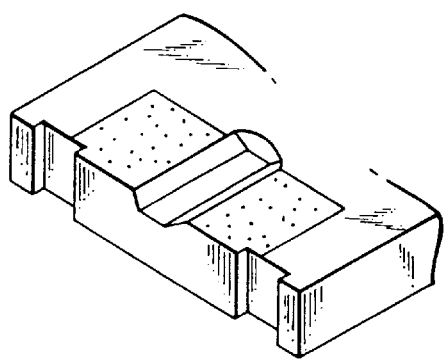
Figure 9D:
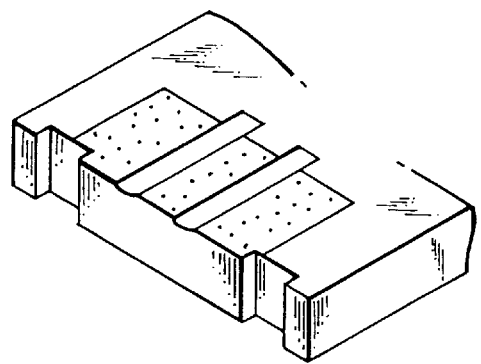

FIG. 8 is a simplified perspective view showing an example of the supporting base plate which constitutes the ink jet recording head in accordance with the present invention.

With reference to FIGS. 6, 7 and 8, the embodiment of the ink jet recording head to which the present invention has been applied will be described.

As illustrated in FIG. 6, an ink jet recording head is composed of a heater board 101 equipped with electro-thermal converting elements, and a second substrate 102 which is joined to the heater board 101 to form recesses and projections constituting a liquid chamber 107 accommodating an ink, and ink passages 108. The second substrate 102 integrally has an orifice plate 104 which includes orifices 109 communicating with the ink passages 108 for ejecting the ink (the second substrate will hereinafter be referred to as a grooved top plate).

The heater board 101 is fixed to a supporting base plate 103 with the use of an adhesive. The grooved top plate 102 is joined to the heater board 101 in such a manner that the electro-thermal converting elements disposed on the heater board 101 will register with the ink passages 108 of the grooved top plate 102. The orifice plate 104 of the grooved top plate 102 is disposed so as to project forward and downward like an apron from a front end surface of the supporting base plate 103.

The ink is supplied from an ink feed member 105 through an ink feed port 102a provided in an upper portion of the grooved top plate 102. The ink feed member 105 has a projecting bar (not shown), and is fixed to the supporting base plate 103 by inserting this projecting bar into a through hole provided in the supporting base plate 103 and thermally caulking the through hole.

The gaps 110a and 11b (see FIG. 7) between the ink feed member 105 and the heater board 101 and between the ink feed member 105 and the grooved top plate 102 as well as a joining area with a tiny gap between the orifice plate 104 and the front end surface of the supporting base plate 103 which is to be sealed with an adhesive, are filled with a sealing compound as an adhesion space.

A neighborhood of the orifice plate 104 which constitutes the ink jet recording head is about 30–40 $\mu$m in thickness, but desirably becomes thicker toward a lower portion of the supporting base plate 103 and has a thickness of 0.2 mm in the present embodiment.

In view of the costs and ink resistance of the materials, thermoplastic resins such as polyimide, polyether ether ketone, or polysulfone can be cited as examples of the materials for the grooved top plate 102 having the orifice plate 104.

In the present embodiment, polysulfone with a small amount of heat deformation at high temperatures was used.

In FIG. 7, the shaded portion represents the area filled with the sealing compound. As illustrated in FIG. 8, the supporting base plate 103 has grooves 103A formed at the right and left end portions of the area overhung by the orifice plate, and also has grooves 103B formed within an area, where the heater board 101 is to be bonded, and extending beyond this area. The groove 103B is 0.5 mm wide, 0.5 mm deep, and 1 mm in the dimension beyond said area. The thickness of the adhesive is 0.04 mm so that the adhesive usable for the heater board 101 is not to fill up the groove 103B.

The groove 103B is not restricted to this size, and may be of any size which permits a thoroughly satisfactory sealing with the adhesive. The heater board 101 is fixed onto the supporting base plate 103 with the use of the adhesive, and the grooved top plate 102 is fixed onto the heater board 101 so that the electro-thermal converting elements disposed on the heater board 101 and the ink passages 107 of the grooved top plate 102 can be registered with each other. The grooved top plate 102 has the orifice plate 104, and the orifice plate 104 is disposed like an apron in front of the front end surface of the supporting base plate 103. The ink feed member 105 is fixed to the supporting base plate 103 by inserting a projecting bar (not shown) provided in the ink feed member 105 into a through hole provided in the supporting base plate 103, and thermally caulking the through hole. In this case, uniform gaps 110a and 110b are formed between the orifice plate 104 and the ink feed member 105. In this embodiment, the gaps 110a and 110b are within the range form 0.1 to 0.2 mm.

The sealing compound is poured through a pour port (not shown) in an upper portion of the ink feed member 105, thereby sealing a wire bonding for transmitting electrical signals, and simultaneously sealing the gaps 110a and 110b between the orifice plate 104 and the ink feed member 105. Then, the sealing compound passes through the grooves 103A and 103B provided in the supporting base plate 103, and completely seals the gapped area between the orifice plate 104 and the front end surface of the supporting base plate 103. That is, the shaded portion as shown in FIG. 7 is filled with the sealing compound. The sealing compound in the present embodiment is a two-part setting polyurethane adhesive which permits the admission of little air into the liquid chamber 107 and which is suitable for the sealing of the wire bonding as mentioned above. Its available viscosity is within the range form 3,000 to 7,000 cps and making the viscosity, making a higher value than that of the prior art.

The groove 103B formed in the upper surface of the supporting base plate 103 can be press-molded in the case of mass production. A plurality of the grooves 103B may be formed, and in this case, these grooves may be arranged in a parallel or in a radial form. The shape of this groove may be square or semicircular in cross section. FIGS. 9A to 9D show examples of its shape. Irrespective of the number and shape of the grooves 103B, it is necessary to determine the method of applying the adhesive for the heater board 101, the thickness of the adhesive, etc. so that the adhesive may not fill up these grooves.

As described above, the supply of the sealing compound into those gaps can be facilitated by the grooves provided in the supporting base plate 103 below the heater board 101 with regard to the sealing of the gaps between the front end surface of the supporting base plate and the orifice plate region. Hence, the use of a high-viscosity sealing compound can be achieved in the present invention.

Embodiment 2

Figure 10:
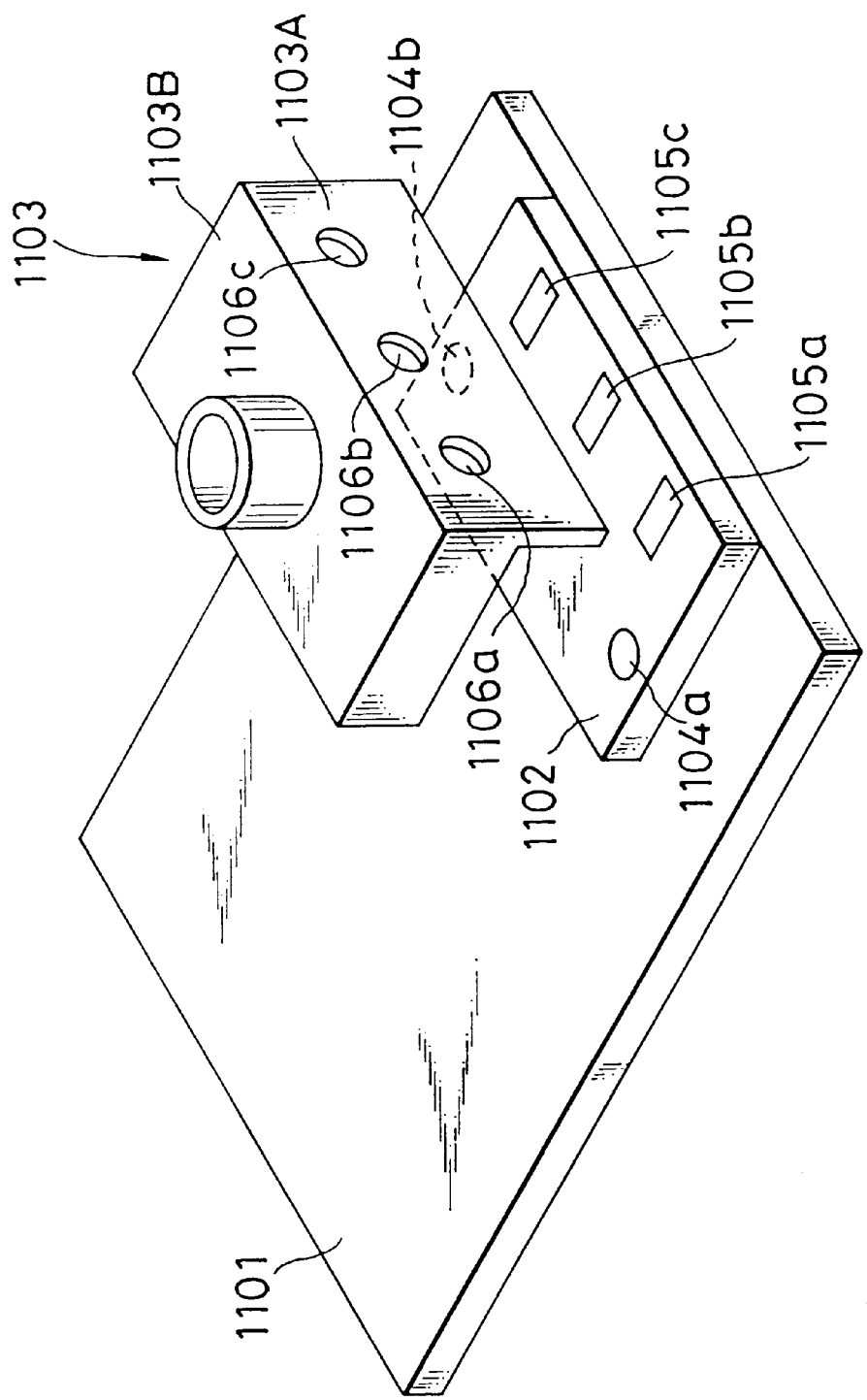
FIG. 10 is an exploded perspective view of the ink jet recording head in accordance with the present invention.

FIG. 10 is an exploded perspective view of the ink jet recording head in accordance with the present invention.

In FIG. 10, the reference numerals 1105a, 1105b and 1105c denote electro-thermal converting elements provided at predetermined positions of a heater board 1102. The heater board 1102 is provided on a support member 1101. A top plate member 1103 is constituted of an integral combination of an orifice plate 1103A where orifices 1106a, 1106b and 1106c are open, and a top plate 1103B where the grooves for the ink passages and a common liquid chamber are provided.

An ink jet recording head is constituted by joining the top plate member 1103 with the heater board 1102 together by use of adhesives 1104a and 1104b. The joining of the top plate member 1103 and the heater board 1102 requires the registration of these members. A mechanism of positional adjustment for this purpose will be described below.

Figure 11:
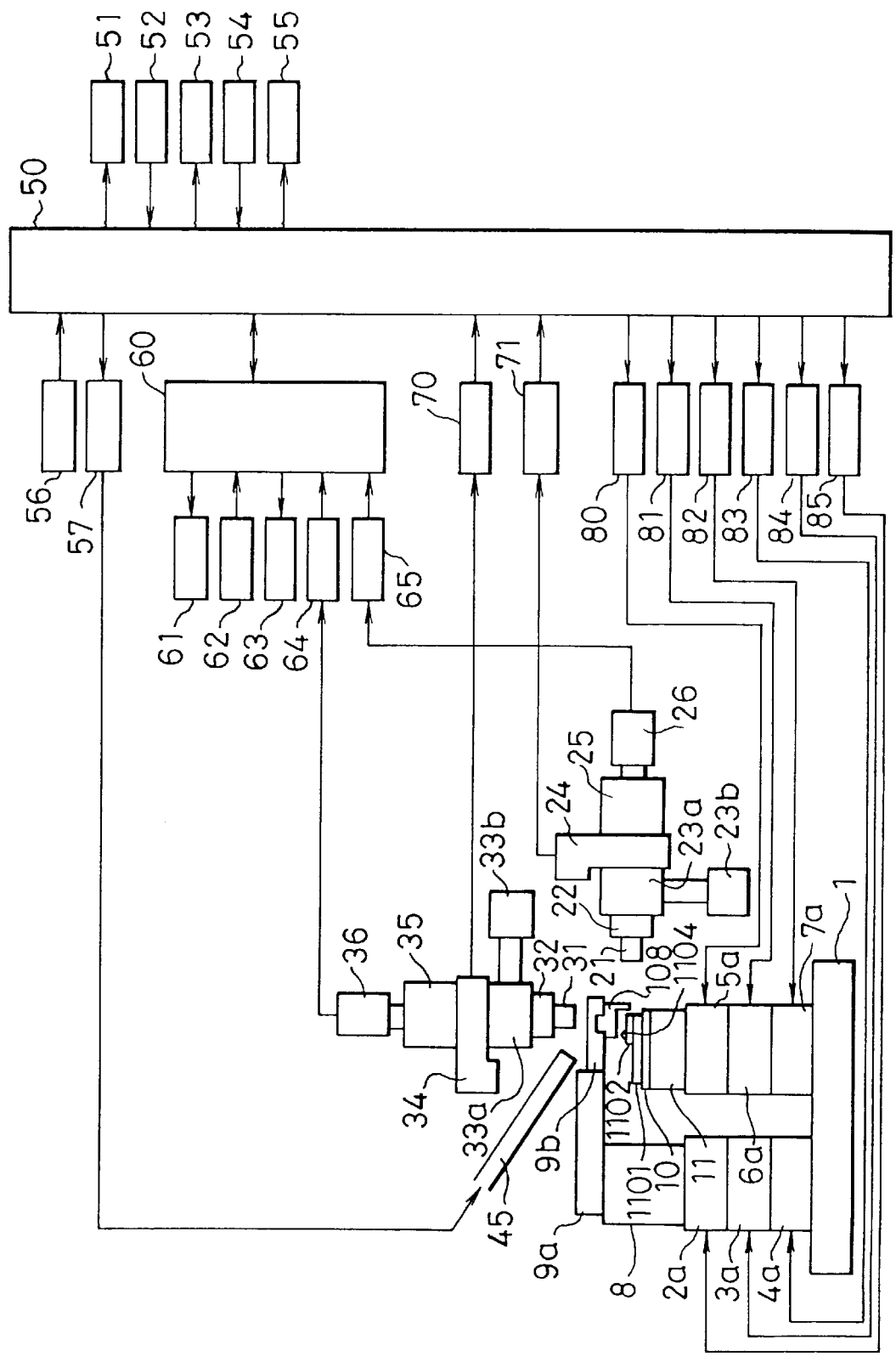
FIG. 11 is a block diagram showing an assembled apparatus for use in the present invention.

FIG. 11 is a block diagram showing an assembled apparatus for use in the present embodiment.

The support member 1101 onto which the heater board 1102 is fixed is gripped by a support member 10 for gripping jig. The support member 10 is provided to be movable in the Y, Z and X directions via a portion 11 for generating joint force by means of a Y stage 5a, a Z stage 6a and an X stage 7a, respectively. The portion 11 generates a pressure in contact with the top plate member 1103 and the heater board 1102, thus bringing the top plate member 1103 and the heater board 1102 into close contact.

The top plate member 1103 is mounted to a spacer 8 via the top plate members 9a and 9b for gripping jigs. The spacer 8 is mounted to a surface plate 1 so as to be movable by a Y stage 2a, a Z stage 3a and an X stage 4a.

To move the heater board 1102 for registration, there are used the Y stage 5a for moving it in the Y direction, the Z stage 6a for moving it in the Z direction, and the X stage 7a for moving it in the X direction. That is, the position of the heater board 1102 is determined primarily by the Y stage 5a, Z stage 6a and X stage 7a.

To move the top plate member 1103, there are used the Y stage 2a for moving it in the Y direction, the Z stage 3a for moving it in the Z direction to move the top plate member 1103 used and the X stage 4a for moving it in the X direction. The Y stage 2a, Z stage 3a and X stage 4a determine the position of the top plate member 1103. That is, the positions of the orifices 1106a, 1106b and 1106c are determined primarily by these stages.

An optical system for detecting the positions of the electro-thermal converting elements 1105a, 1105b and 1105c is composed of an objective lens 31, an objective lens holder 32, an illumination member 33a, a optical system 34 for discriminating focal situation, a lens-barrel 35, and an ITV camera 36. This optical system is mounted to the surface plate 1 via a supporting column (not shown).

The optical system 34 mentioned above transmits a signal for detecting focal situation to a control computer 50 via a focal situation detector 70. The ITV camera 36 transmits an image signal to an image processing unit 60 via a signal converter 64. In this way, a mechanism for detecting the positions of the electro-thermal converting elements is constituted.

For performing registration, an optical system for detecting the positions of the orifices 1106a, 1106b and 1106c of the orifice plate 1103A is composed of an objective lens 21, an objective lens holder 22, an illumination member 23a, an optical system 24 for discriminating focal situation, a lens-barrel 25, and an ITV camera 26. This optical system is mounted to the surface plate 1 via a supporting column (not shown). The optical system 24 transmits a signal for detecting focal situation to the control computer 50 via a focal situation detector 71. The ITV camera 26 transmits an image signal to the image processing unit 60 via a signal converter 65. In this way, a mechanism for detecting the positions of the electro-thermal converting elements is constituted.

Figure 12:
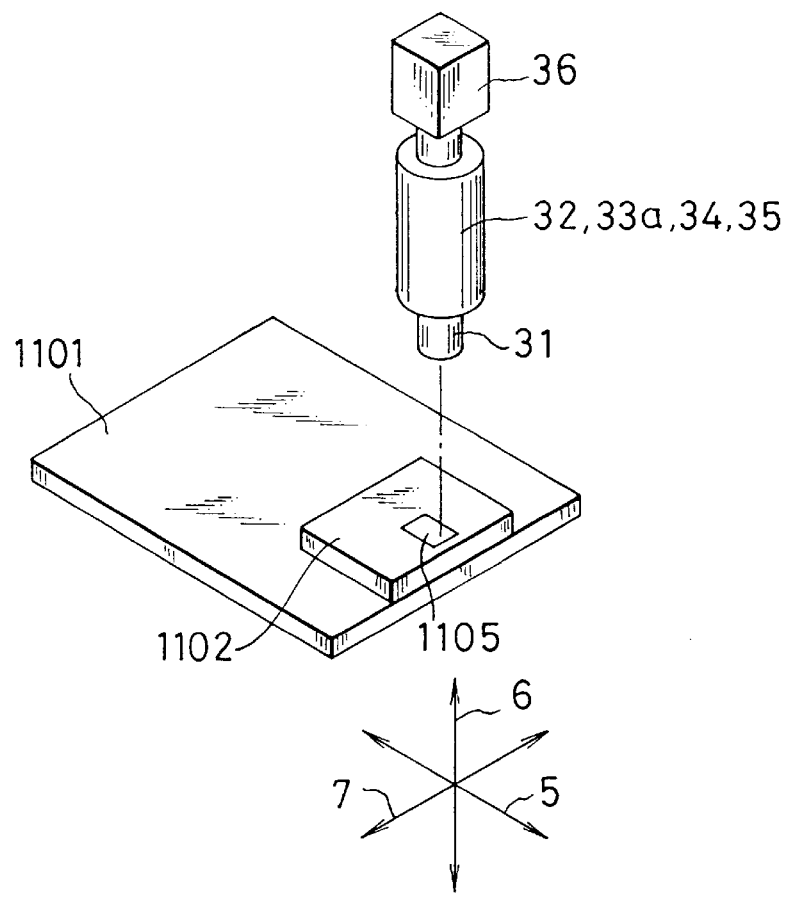
FIG. 12 is a perspective view of an optical system for detecting the position of the electro-thermal converting element.

FIG. 12 is a perspective view for illustrating the details of the above-described optical system for detecting the positions for the electro-thermal converting elements.

When the registration of the electro-thermal converting element 1105 is to be carried out, the support member 1101 is moved in the directions indicated by arrows 5 and 7 as shown in FIG. 12 by operating the Y stage 5a and X stage 7a, respectively, while confirming the position of the electro-thermal converting element 1105 with the ITV camera 36.

In FIG. 12, the reference numerals 5, 6 and 7 designate the Y, Z and X directions in which the heater board 1102 is moved. In FIG. 12, the same reference numerals as in FIG. 11 represent the same construction as shown in FIG. 11.

Figure 13:
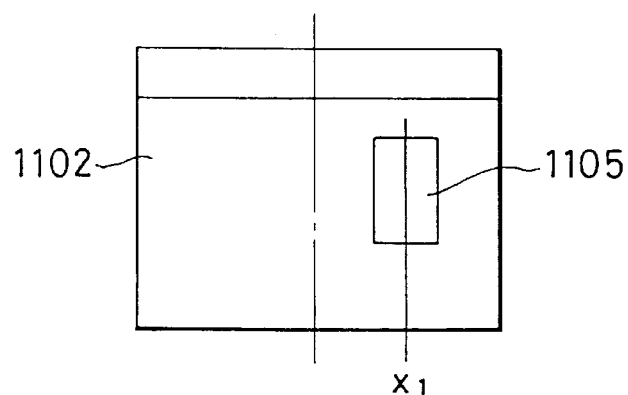
FIG. 13 is a schematic view of an image obtained with an ITV camera.

FIG. 13 is a schematic view of an image obtained with the ITV camera 36.

In FIG. 13, $x_1$ designates the coordinate value in the X direction as calculated after processing the image obtained with the ITV camera 36 by means of the image processing unit 60. The image processing unit 60 transmits the value of $x_1$ for the position of the electro-thermal converting element 1105 to the control computer 60, which stores this data. The coordinate value in the Y direction can be obtained in the same manner. On the basis of the coordinate values in the X and Y directions that have been stored, the X stage 7a and the Y stage 5a are moved to move the heater board 1102, thereby performing the registration of the electro-thermal converting element 1105.

Figure 14:
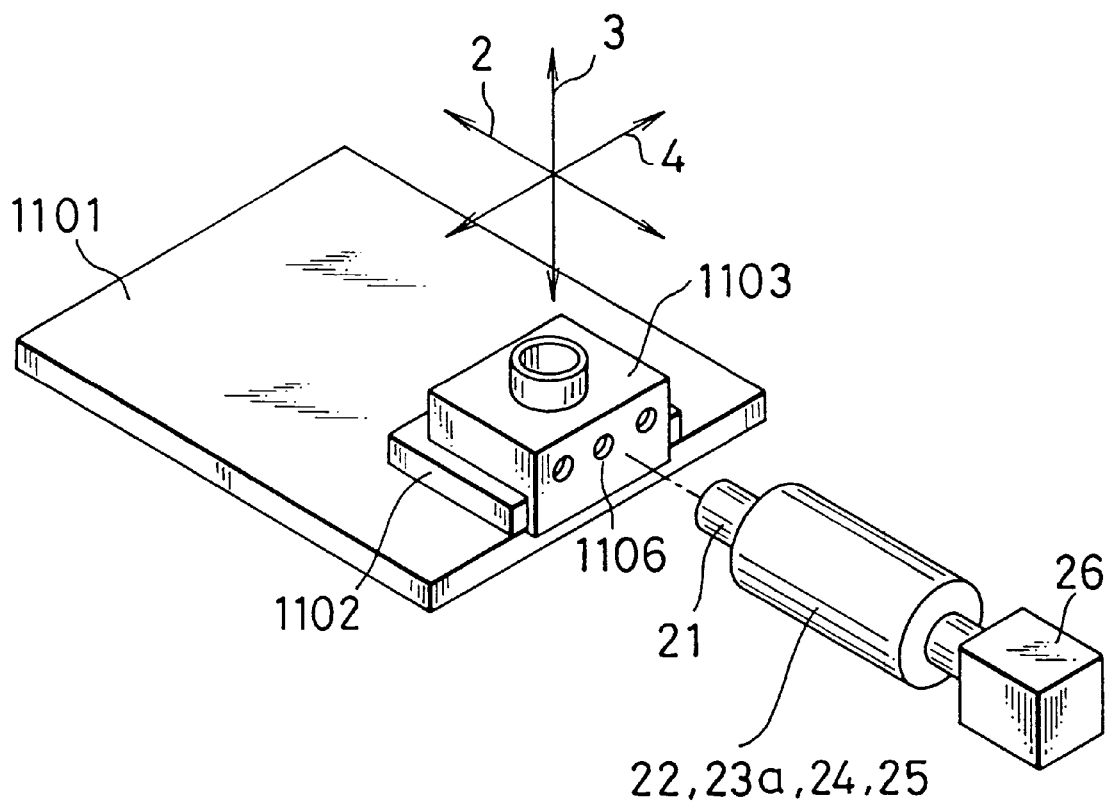
FIG. 14 is a perspective view of an optical system for detecting the position of the orifice.

FIG. 14 is a perspective view illustrating the details of the optical system for detecting the position of the orifice.

When the registration of the orifice 1106 is to be carried out, the top plate member 1103 is moved in the directions indicated by arrows 4 and 3 by operating the X stage 4a and Z stage 3a, respectively, while confirming the position of the orifice 1106 with the ITV camera 26.

In FIG. 14, the reference numerals 2, 3 and 4 designate the Y, Z and X directions in which the top plate member 1103 is moved.

In FIG. 14, the same reference numerals as shown in FIG. 11 represent the same constructions as in FIG. 11.

Now, referring to FIG. 11 again, a light guide 45 is installed beside the top plate member 1103. This light guide 45 enables ultraviolet rays emitted by an ultraviolet light source 57 to be projected onto the adhesive 1104 at a joint portion between the top plate member 1103 and the heater board 1102, whereby the adhesive can be set.

The image processing unit 60 calculates the positions of the orifice and the electro-thermal converting element on the basis of image signals obtained with the ITV cameras 26 and 36, and transmits this data to the control computer 50. To the image processing unit 60 are connected an ITV monitor 63 for confirming an image measured, a keyboard 62 for entry of an apparatus for adjusting program and inputting data, and a CRT monitor 61 for data display, thereby establishing an man-machine interface.

The control computer 50 calculates the data transmitted by the focal situation detectors 70, 71 and the image processing unit 60. On the basis of such data, the control computer 50 drives and controls the stages 2a, 3a, 4a and 5a, 6a and 7a via stage drivers 80 to 85, thereby moving the top plate member 1103 and the heater board 1102 to bring the positions of the heater and the orifice into agreement.

These operations are performed on the basis of an operation program stored in a program disk 54. To the control computer 50 are connected an operating panel 56 for operating the assembled apparatus, a keyboard 52 for setting and switching the operation program, a CRT monitor 51 for data display, a printer 53 for data recording, and a data disk 55 for data storage, thereby establishing a man-machine interface.

Next, details of assemblage of the ink jet recording head in accordance with the present embodiment will be described by use of FIG. 15.

Figure 15:
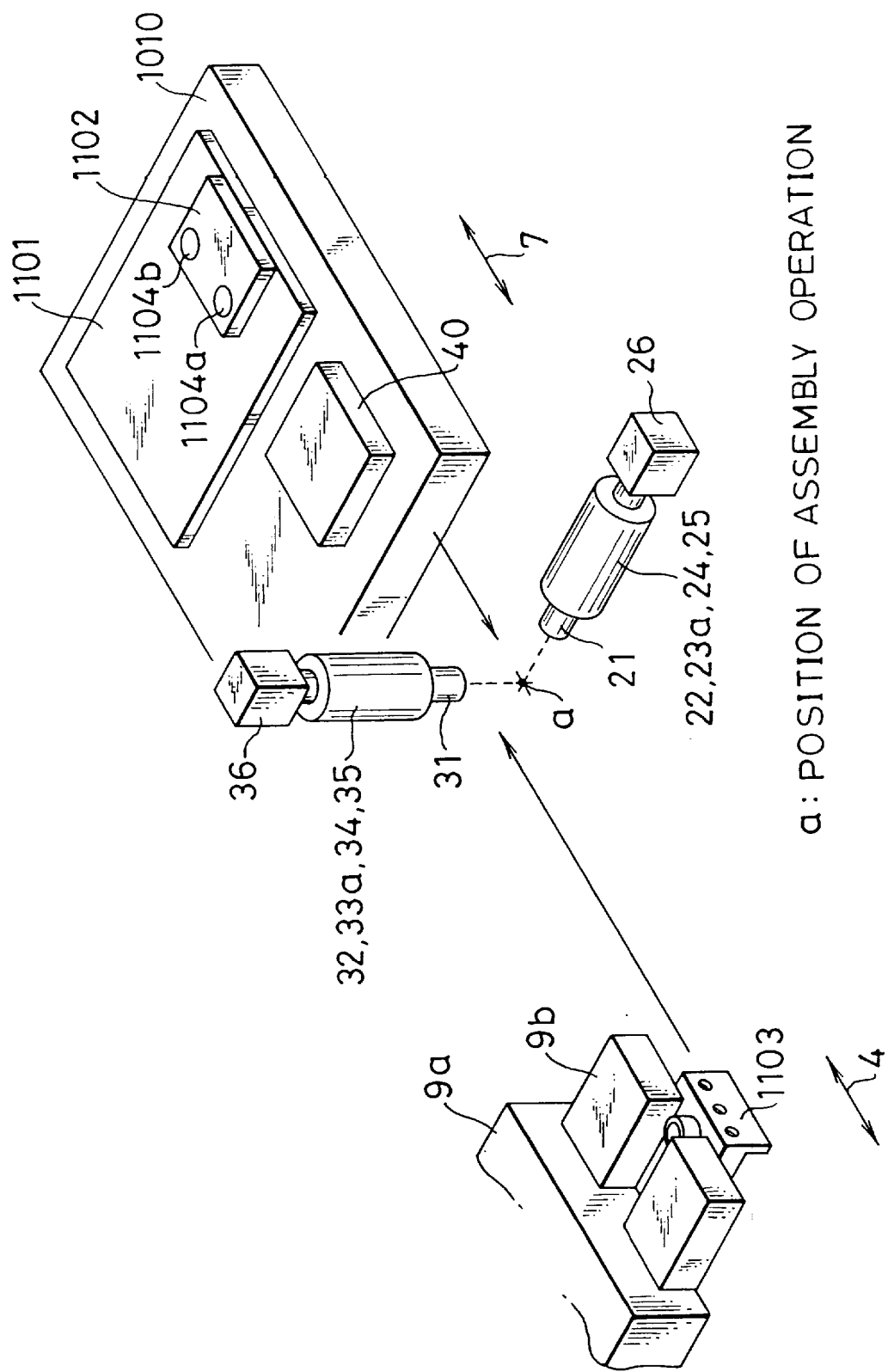
FIG. 15 is a perspective view showing the situation in which component parts are supplied to the assembled apparatus as shown in FIG. 11.

FIG. 15 shows a situation in which when the recording head is to be assembled, the top plate member 1103 and the support member 1101 having the heater board 1102 fixed thereto are supplied to the top plate member for gripping jigs 9a, 9b and the support member for gripping jig 10.

In FIG. 15, the top plate members for gripping jigs 9a, 9b and the support members for gripping jig 10 are positioned at places retreated from the position of assembly operation a, by operating the X stages 4a and 7a, thus facilitating positioning automatically or by use of a robot. Then, the X stage 7a is operated to move a calibration chart 40 fixed onto the base plate for gripping jig 10 to the position of assembly operation a.

In FIG. 15, the same reference numerals as in FIGS. 10 and 11 represent the same members, and for this reason their descriptions will be omitted.

Figure 16A:
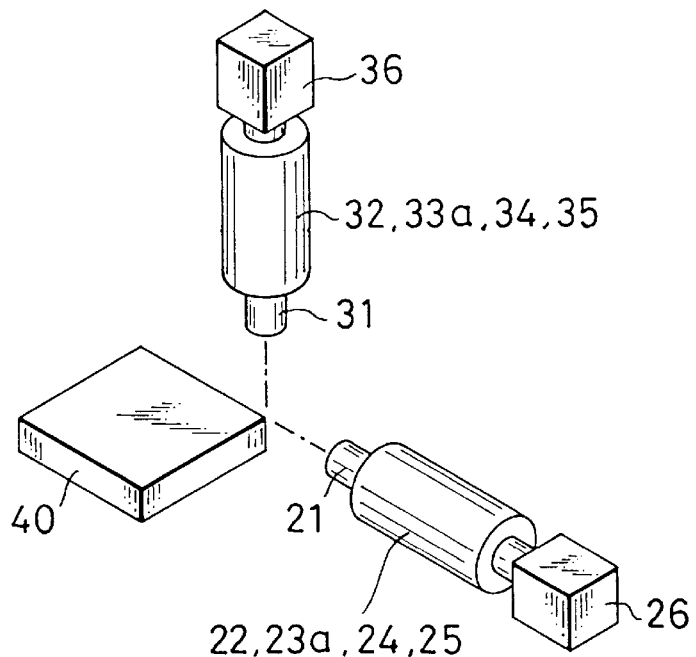
FIGS. 16A to 16C are explanatory views showing a method of measuring the deviation of the optical axis with the use of a calibration chart.

FIG. 16A shows a method for calibrating a deviation of the position of detection by mechanism 31 to 36 for detecting a heater position and an orifice detection mechanism 21 to 26 for detecting the orifice position by use of a calibration chart 40.

Figure 16B:
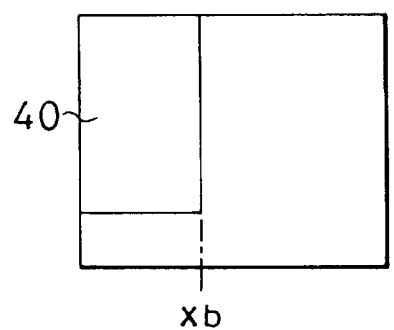
Figure 16C:
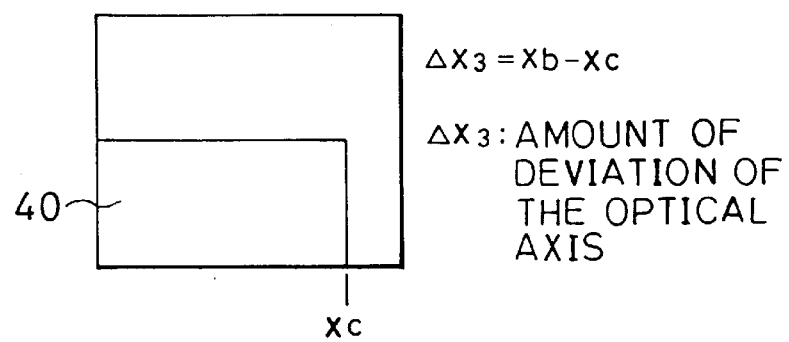

In FIG. 16A, when a corner of the rectangular parallelepiped calibration chart 40 is measured with the mechanism 31 to 36 for detecting the position of the electro-thermal converting elements and the orifice detection mechanisms 21 to 26 in the positional relationship, the images obtained with the ITV cameras 36 and 26 are as shown in FIGS. 16B and 16C.

In FIGS. 16B and 16C, $x_b$ and $x_c$ designate the coordinate values obtained, when images obtained with the ITV cameras 36 and 26 are processed and calculated by the image processing unit 60. Since $x_b$ and $x_c$ are the measured results of the same place of the calibration chart 40, $\Delta x_3 = x_b - x_c$ is determined by the deviation of the optical axis between the mechanism 31 to 36 for detecting the position of the electro-thermal converting elements and a detection mechanism 21 to 26 for detecting the position of the orifices.

Here, the image processing unit 60 transmits the measured values of $x_b$ and $x_c$ to the control computer 50, which calculates and stores the amount of deviation of the optical axis, $\Delta x_3 = x_b - x_c$.

Then, the X stage 7a is operated to move the support member 1101 and heater board 1102 held on the support member for gripping jig 10 to the position of assembly operation a (see FIG. 15).

Figure 17A:
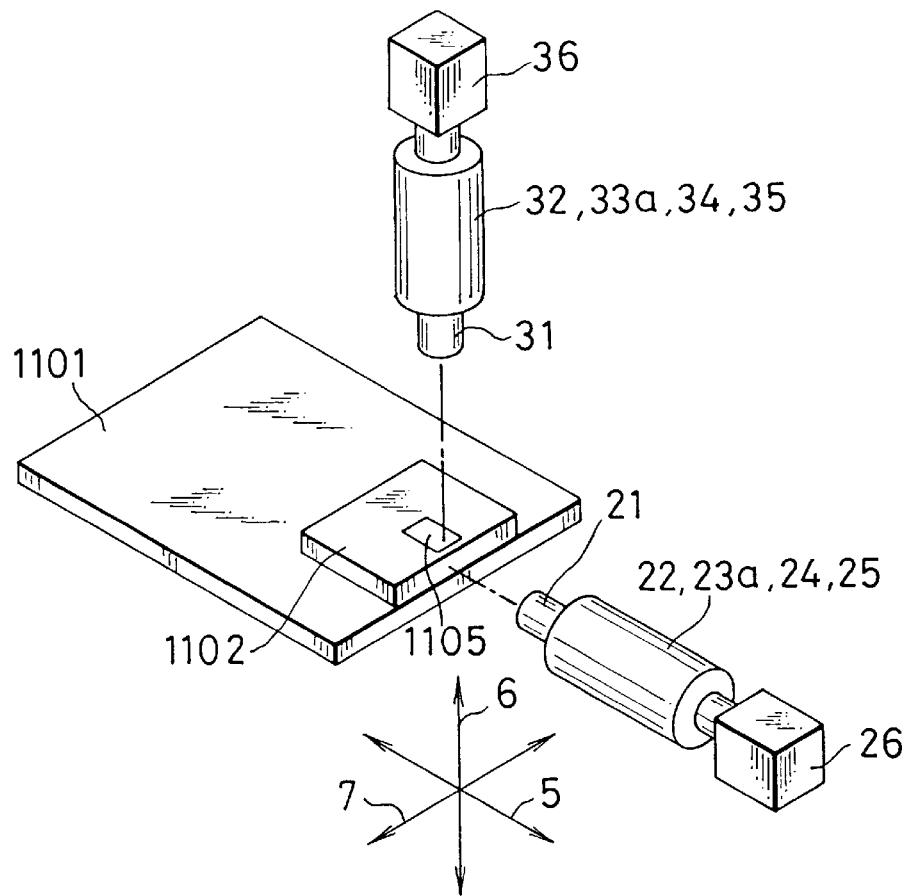
FIGS. 17A and 17B are explanatory views showing a method of measuring the position of the electro-thermal converting element.

FIG. 17A shows a manner in which the position of the electro-thermal converting element 1105 on the heater board 1102 is measured with the use of the position detection mechanism 31 to 36 for the electro-thermal converting element. In FIG. 16A, the deviation of the heater board 1102 from the focus is measured with the optical system 34 for discriminating the focal situation and the focal situation detector 70, and this data is transmitted to the control computer 50. The computer 50 calculates the amount of deviation, and operates the Z stage 6a, to bring about a focal situation.

Figure 17B:
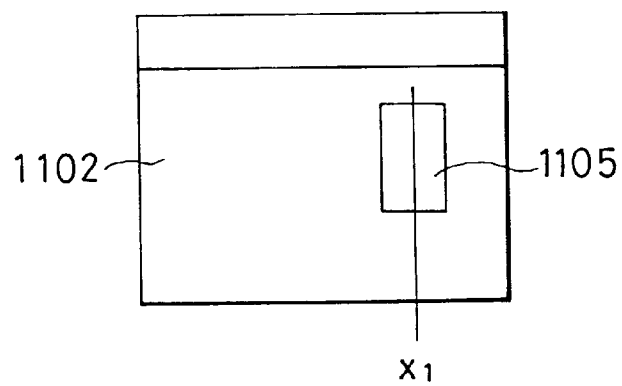

Then, the deviation of the end of the heater board 1102 from the focus is measured with the optical system 24 and the focal situation detector 71, and this data is transmitted to the control computer 50. The computer 50 calculates the amount of deviation, and operates the Y stage 5a, to bring about a focal situation. This procedure gives a clear image of the electro-thermal converting element 1105 as shown in FIG. 17B.

Then, the X stage 4a is operated to bring the top plate member 1103 gripped by the top plates for gripping jigs 9a, 9b to the position of assembly operation a.

FIGS. 18A to 18G show procedures for conforming the position of the orifice to the position of the electro-thermal converting element, followed by fixing these positions.

Since the top plate member 1103, the heater board 1102 and the electro-thermal converting element 1105 are microscopically processed parts, they may be damaged if an excessive force is applied. Hence, an external force to be exerted on the top plate member 1103, the heater board 1102 and the electro-thermal converting element 1105 needs to be minimized during adjustment.

The assembly procedure will be described with reference to FIGS. 18A to 18G.

Figure 18A:
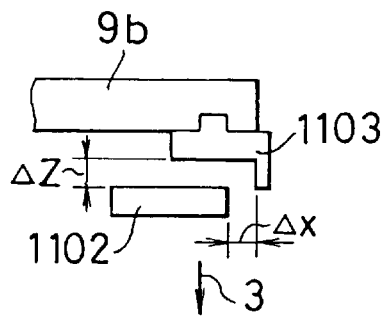
FIGS. 18A to 18G are explanatory views showing a method of conforming the position of the orifice to the position of the electro-thermal converting element with each other, and fixing their positions relative to each other.
Figure 18B:
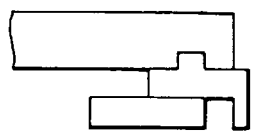

When the top plate member 1103 is to be brought to the position of assembly operation a, the top plate member 1103 is positioned above the heater board 1102, with determined gaps $\Delta z$ and $\Delta x$ secured therebetween as shown in FIG. 18A. The top plate member 1103 and the heater board 1102 can be prevented from being damaged when the top plate member 1103 being moved is slid on the heater board 1102. Then, the top plate member 1103 is moved in the directions of arrows 3 and 2 as shown in FIGS. 18B and 18C by means of the Z stage 3a and the Y stage 2a, bringing the top plate member 1103 and the heater board 1102 into contact.

Then, the X stage 4a is operated to move the electro-thermal converting element 1105 and the orifice 1106 in the direction of arrow 4, thereby bringing their positions into conformity. At this time, if the thickness of the top plate member 1103 is large, a frictional force produced between the top plate member 1103 and the heater board 1102 is large, thus presenting the risk of damaging both members during their registration. If the thickness of the top plate member 1103 is small, on the other hand, a gap appears between the top plate member 1103 and the heater board 1102, making the movement of the top plate member 1103 unstable during registration, and making accurate registration impossible. Hence, the thickness of the top plate member 1103 needs to be measured. The method for measuring the thickness of the top plate member will be described in the following.

Figure 18C:
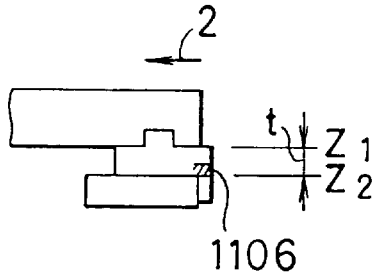
Figure 18D:
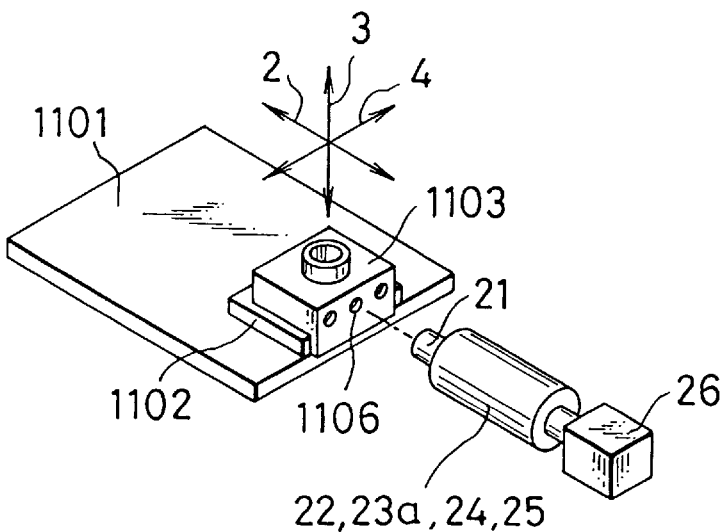
Figure 18E:
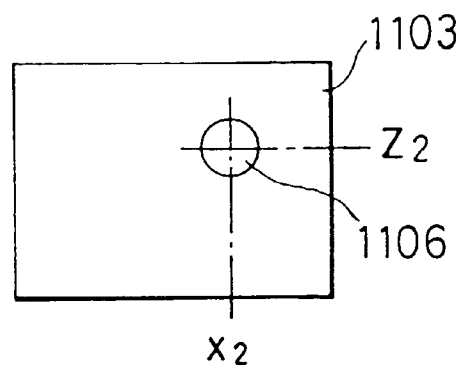

In FIG. 18C, when the top plate member 1103 and the heater board 1102 are brought into close contact, the mechanisms 21 to 26 are used to measure the position of the orifice 1106. FIG. 18D shows the situation of measuring the position of the orifice 1106, and an image as shown in FIG. 18E is obtained with the ITV camera 26. In FIG. 18E, $z_2$ and $x_2$ designate the coordinate values in the z and x directions, respectively, these values having been obtained by processing and calculating on the image of the orifice 1106 obtained with the ITV camera 26 by means of the image processing unit 60. The image processing unit 60 transmits the measured values $z_2$ and $x_2$ to the control computer 50, which in turn calculates the value for $t=z_1-z_2$ from the value of $z_1$, the position of the top plate member for gripping jig 9b, the position of the orifice $Z_2$ at this time, whereby the thickness t of the top plate member 1103 is determined. The pressure of contact between the top plate member 1103 and the heater board 1102 can be made constant by moving the Z stage on the basis of the value t.

Then, the control computer 50 calculates $\Delta x_m$, the amount of movement of the orifice on the basis of the already stored values, i.e. the coordinate value $x_1$ of the heater 1105, the deviation $\Delta x_3$ of the optical axis of the position detecting mechanism, and the position $x_2$ of the orifice measured as shown in FIGS. 18D and 18E. $\Delta x_m$ can be calculated as follows: The amount of movement of the orifice $\Delta x_m = x_1 - x_2 + \Delta x_3$. The control computer 50 actuates the X stage 4a on the basis of the value $\Delta x_m$, bringing the position of the electro-thermal converting element and the position of the orifice into conformity.

Figure 18F:
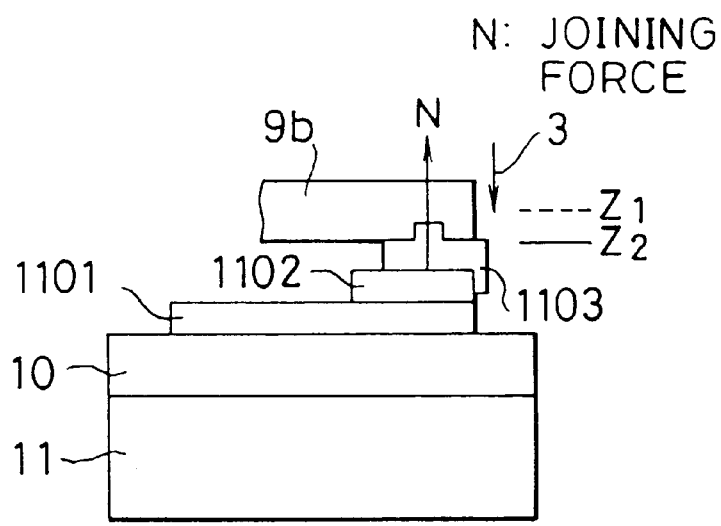

Then, the Z stage 3a is moved from $z_1$ to $z_3$ in the direction of arrow 3 as shown in FIG. 18F. At this time, pressure is exerted on a portion 11 for generating a joining force, which in response to this, generates a resisting force in a direction opposite to the direction of the movement of the Z stage 3a. Since the top plate member 1103 is fixed in place by means of the top plate gripping jig 9b, a stress N is concentrated in the contact portion between the top plate member 1103 and the heater board 1102. This stress N acts as a joining force, securing a close contact between the top plate member 1103 and the heater board 1102.

Figure 18G:
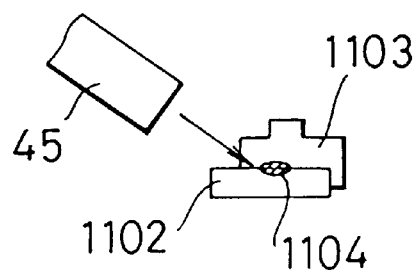

As shown in FIG. 18G, ultraviolet rays are irradiated from the light guide 45 onto the adhesive 104, thereby setting the adhesive. Thus, the registration and assembly of the top plate member 1103 and the heater board 1102 are completed. After each stage has been moved to the positions as shown in FIG. 15, an assembly is discharged automatically or by use of a robot, thereby completing a series of steps for assembling the recording head. Successively, a next top plate member 1103 and a next support member 1101 are supplied to permit an continuous assembly operation.

Then, the method of forming orifices will be described. A first method of orifice formation comprises the steps of joining the orifice plate to an end surface of the top plate which has been processed to have grooves for ink passages and then of irradiating a laser beam onto the orifice plate through the mask, thereby forming orifices.

Figure 19:
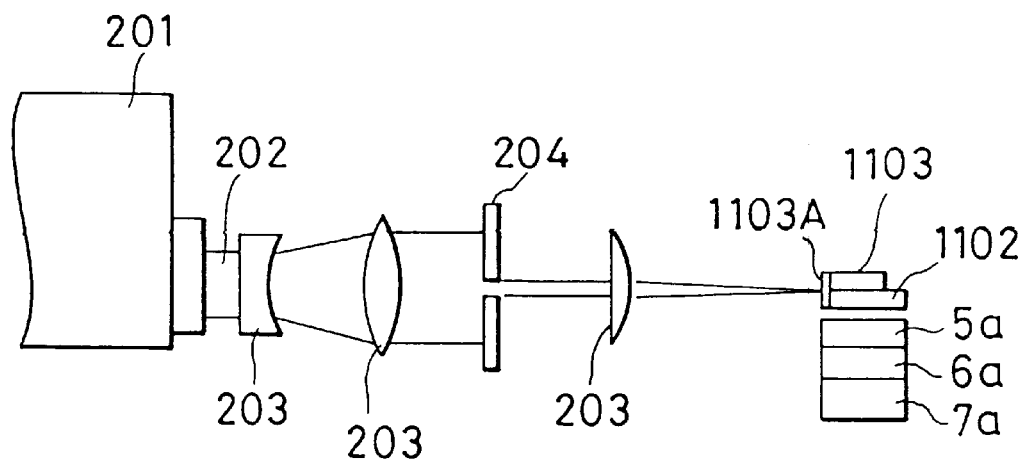
FIG. 19 is a schematic constructional view of an orifice-forming apparatus for forming an orifice by means of laser beam machining.

FIG. 19 is a schematic constructional view of an orifice forming apparatus for processing an orifice by the use of a laser beam. In FIG. 19, the laser beam is irradiated onto the orifice plate at its front surface. The reference numeral 201 designates an ultraviolet laser machine, 202 a laser beam irradiated by the ultraviolet laser machine 201, 203 a lens system, 204 a mask with all or some of patterns of the orifice, 1102 a heater board, and 5a, 6a and 7a stages for moving the heater board 1102 in the Y, Z and X directions.

The second method for forming orifices is to irradiate an ultraviolet laser beam onto a top plate member 1103 composed integrally of a top plate and an orifice plate from its rear surface with grooves for the ink passages formed.

Figure 20:
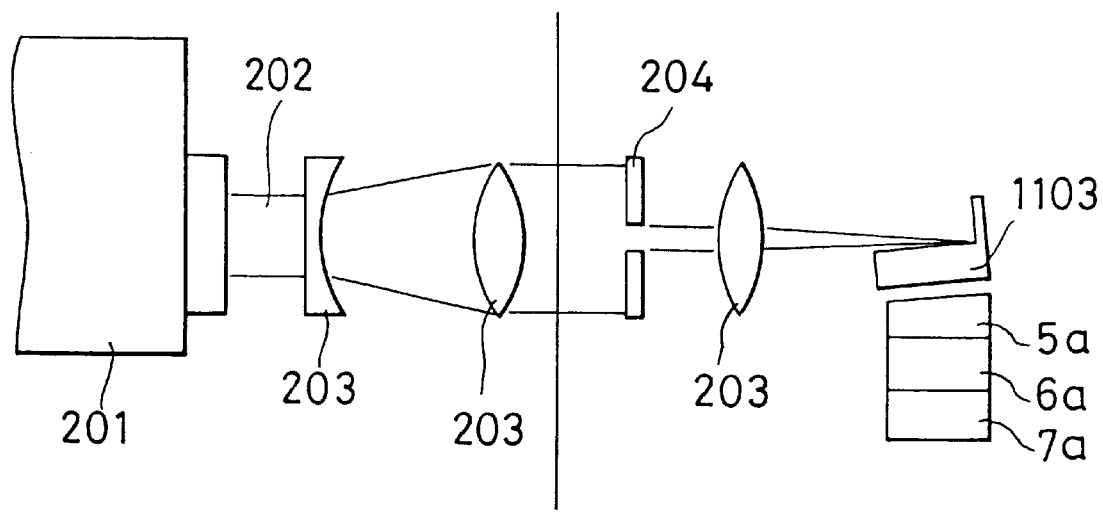
FIG. 20 is a schematic constructional view of another orifice-forming apparatus for forming an orifice by means of laser beam machining.

FIG. 20 is a schematic constructional view showing another orifice forming apparatus for forming an orifice with the use of a laser beam. In this drawing, the same elements as shown in FIG. 19 designate the same reference numerals.

The ultraviolet laser beam source for use is a KrF excimer laser apparatus, which produces a pulsed laser beam with a wavelength of 248 nm and a pulse width of 15 nsec. The lens system includes synthetic quartz lenses with an anti-reflection coating. The mask is an aluminum-vapor-deposited projection mask capable of shielding the KrF laser beam.

Figure 21A:
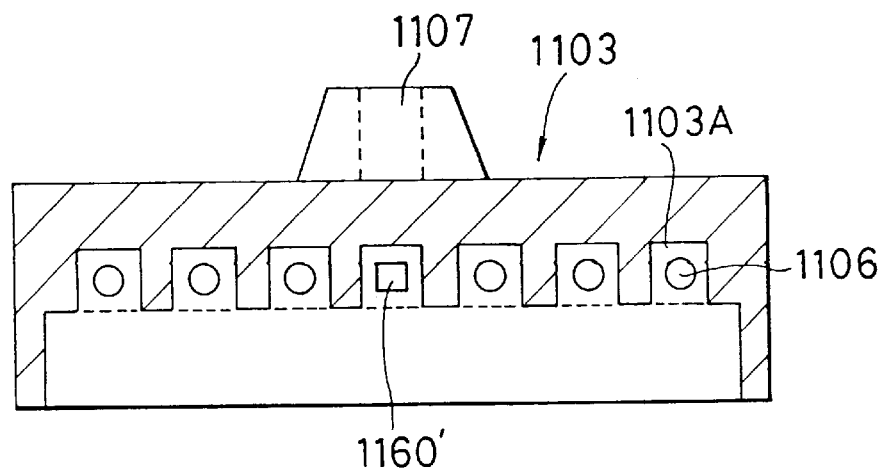
FIGS. 21A and 21B are explanatory views for explaining the top plate member in accordance with the present invention.
Figure 21B:
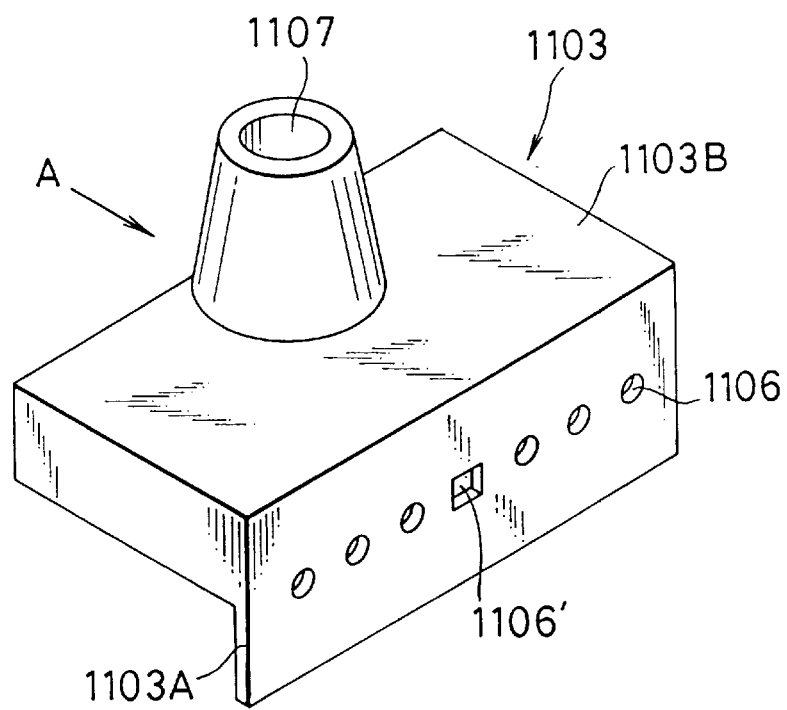

FIGS. 21A and 21B show schematic views of the top plate member 1103 in accordance with the embodiment of the present invention.

As shown in FIG. 21, the orifices formed in an orifice plate 1103A of the present embodiment include square and round orifices. The orifices of such shapes are obtained by irradiating laser beam onto the orifice plate 1103A through the mask by means of the apparatuses as shown in FIGS. 19 and 20. The orifice plate 1103 of the present embodiment is provided integrally with the top plate 1103B as shown in FIG. 21B.

FIG. 21A is a schematic rear view of the members of FIG. 21B as viewed in the direction of an arrow A, and FIG. 21B is a schematic perspective view of the orifice plate 1103.

As are apparent from FIGS. 21A and 21B, the orifice plate 1103A has a square orifice 1106' formed in the center, and round orifices 1106 arranged in a row on both sides of the square orifice 1106'. The reference numeral 1107 is an ink feed port for feeding an ink to the common liquid chamber (not shown).

This formation of one orifice different from the other orifices in shape facilitates the aforementioned registration of the electro-thermal converting element 1105 and the orifice 1106. This will be described in more detail below.

The square orifice 1106' can be easily discriminated by image recognition on the basis of the data on the different shapes of the other orifices stored in the control computer 50. Since the position of the square orifice 1106' in the orifice plate 1103A has been already known, the square orifice 1106' can be registered in correspondence to electro-thermal converting element 1105.

Consequently, the orifice and the electro-thermal converting element become free from deviation unlike the conventional embodiments, thus making it possible to produce a highly reliable ink jet recording head without adversely affecting the ink ejection characteristics.

In the present embodiment, the orifice 1106' as a reference object for registration which is different from the orifices 1106 of an ordinary round shape is made into a square shape. However, any shape is acceptable so long as it is different from the round shape. For example, a triangular, hexagonal or trapezoidal shape as illustrated in FIG. 22A to 22C may be used.

Embodiment 3

Figure 23:
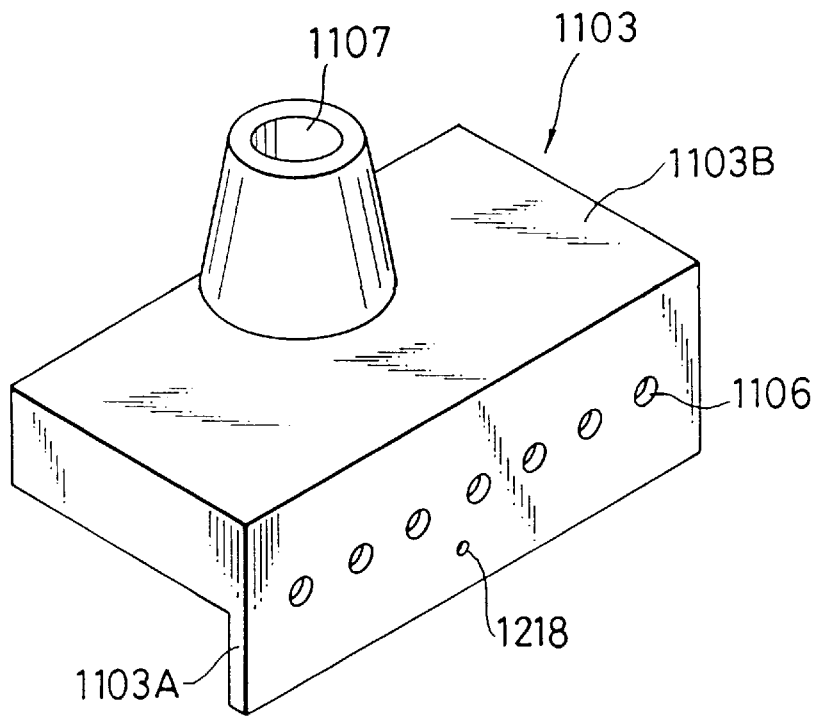
FIG. 23 is a schematic perspective view of the ink jet recording head in accordance with the present invention.

FIG. 23 is a schematic perspective view showing another embodiment of the present invention.

In the present embodiment, the procedure for forming orifices using the laser beam is the same as the aforementioned method of orifice formation. In this embodiment, a tiny hole 1218 is formed as a reference object for registration in the vicinity of the orifice 1106 at the stage of laser beam machining. In this case, the tiny hole 1218 is confirmed by image processing in the manner as mentioned above, and then the orifice closest to this hole 1218 is detected. Once this orifice is detected, the electro-thermal converting element and the orifice plate integrated with the top plate are brought into registration for joining in the same manner as in embodiment 2 to produce an ink jet recording head.

Figure 24:
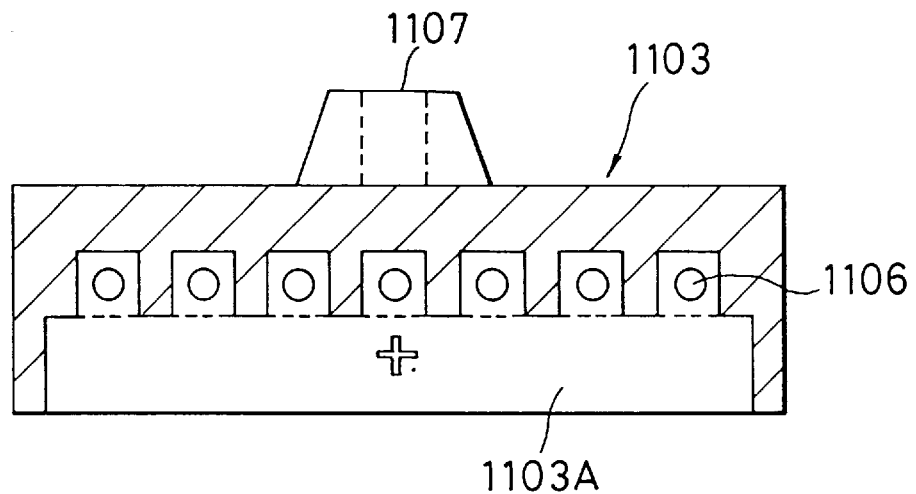
FIG. 24 is a rear view of still another orifice plate of the ink jet recording head in accordance with the present invention.

In this embodiment, the tiny hole 1218 is perforated to detect the position of the orifice, but a cruciform opening as shown in FIG. 24 may be formed. When its shape is to be recognized with an image processing unit, the cruciform opening can be completely distinguished from dust or a scar because of its characteristic shape, and its shape can be discriminated correctly. In addition, such a shape clearly includes an X component and a Y component in image processing, thus facilitating the detection of its position, and permitting the accurate registration of the electro-thermal converting element with the orifice.

Embodiment 4

Figure 25:
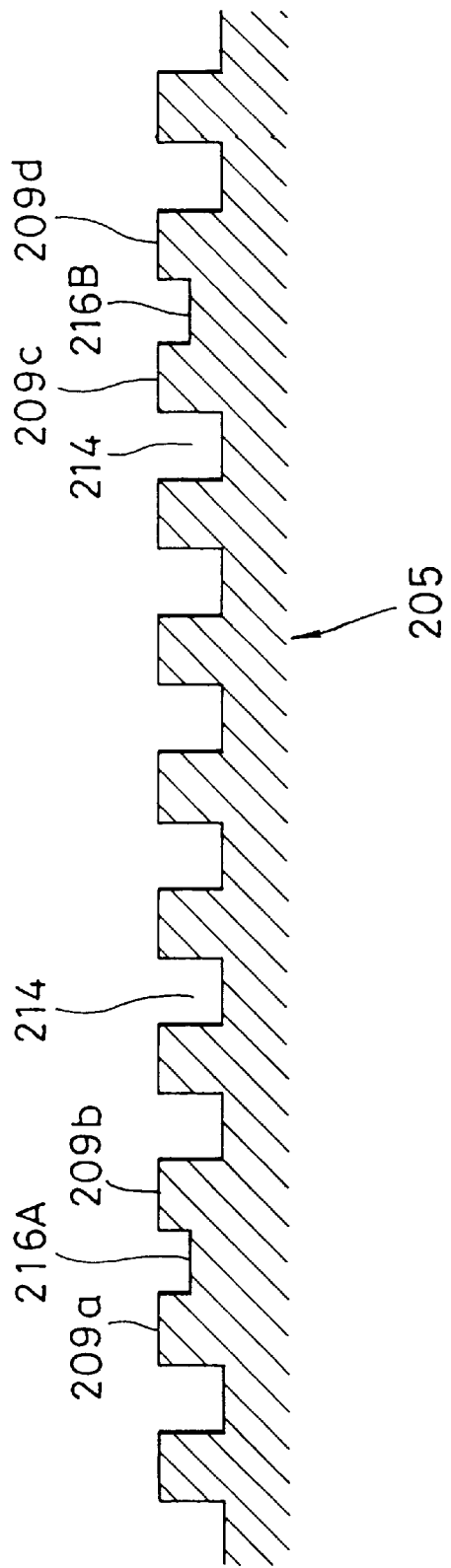
FIG. 25 is a sectional view of the top plate in accordance with the embodiment of the present invention.
Figure 26:
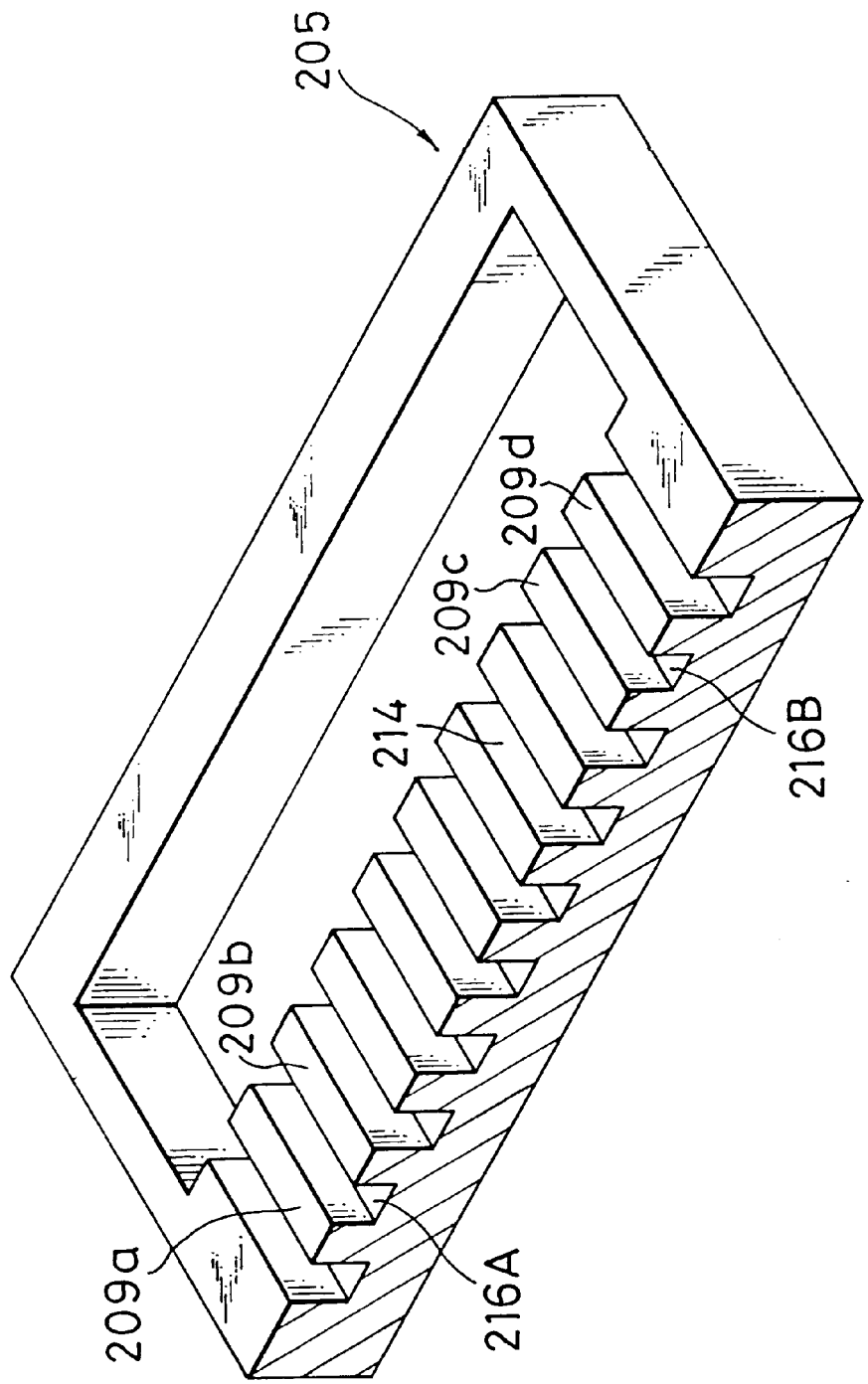
FIG. 26 is a perspective view of the top plate in accordance with the embodiment of the present invention.

FIGS. 25 and 26 are a front view and a perspective view, respectively, of the top plate in accordance with the embodiment of the present invention.

The top plate has grooves for ink passages and a groove for a common liquid chamber formed therein, and the joining of such a top plate with the heater board formed the electro-thermal converting elements constitutes the ink jet recording head.

In FIGS. 25 and 26, the reference numeral 214 designates the grooves for ink passages 209a to 209d are partitions for forming the grooves for ink passages 214, and 216A and 216B are the reference objects for registration which are provided close to both ends of the top plate. In this embodiment, the reference objects for registration are formed with the same shape and at the same pitch as the grooves for the ink passage 214.

In detail, the reference objects for registration are provided between the partitions 209a and 209b and between the partitions 209c and 209d so as to have a height which is half of the height of the wall of the ink passage. The grooves for the ink passages corresponding to the orifices for ejecting the ink are provided between the reference objects for registration. Since no ink is ejected from the reference object for registration, it is preferred to provide the reference object for registration in the vicinity of both ends of the top plate so as not to deteriorate the recording grade.

The top plate is formed with a high ink resistance resin, such as polysulfone, polyether sulfone, polyphenylene oxide or polypropylene by molding. The top plate as so molded is mounted to a laser beam apparatus. Laser beam machining for orifice formation in the present embodiment will be described with reference to FIG. 27.

Figure 27:
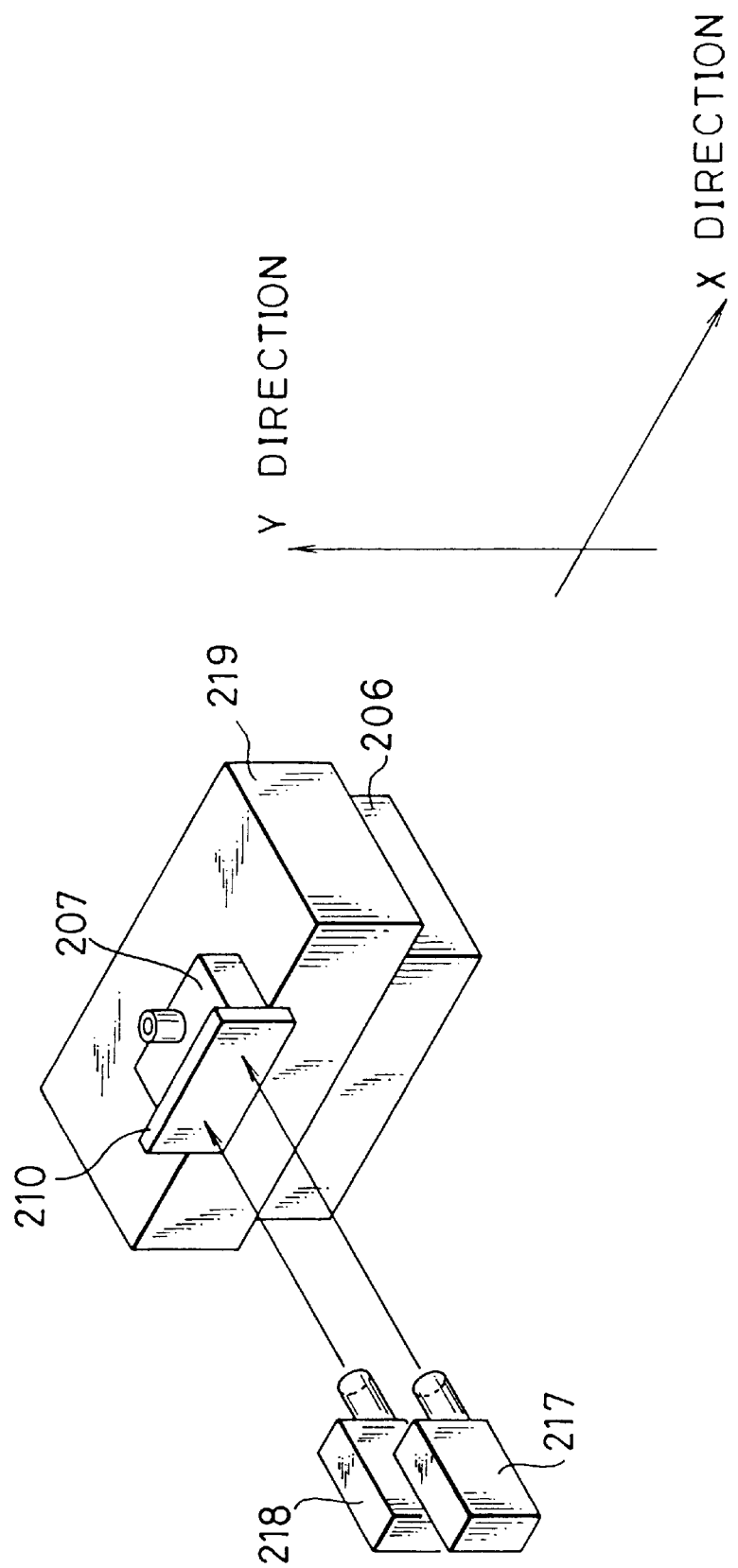
FIG. 27 is a schematic perspective view showing a method of registration in accordance with the embodiment of the present invention.

In FIG. 27, the reference numeral 210 represents an orifice plate capable of transmitting a laser beam, 207 a top plate made of the above-mentioned resin, 217 and 218 cameras, 219 a support member for supporting the top plate, and 206 a movable stage for moving the support member 219.

The reference objects for registration 216A and 216B formed to a half of the height of the partition are clearly different in shape from the other grooves for the ink passages. Hence, the images of 216A and 216B (see FIG. 25) can be easily confirmed by means of the image processing unit.

Once these images can be confirmed, the registration of the images in the X and/or Y directions is performed. Namely, the reference objects for registration 216A and 216B are confirmed by use of the cameras 217 and 218, respectively, and the registration between the grooves for the ink passages which serve as the reference for the movement of the movable stage 206 is performed on the basis of their positions and the orifice site where the laser beam is to be irradiated.

Then, the laser beam is irradiated onto that site of the orifice plate where the laser beam is to be irradiated, thereby the orifice is formed. The positions of the orifices to be formed are determined primarily by the reference objects for registration 216A and 216B, thus permitting the formation of orifices with high accuracy.

Furthermore, it suffices to input the images at two points, i.e. the reference objects for registration 216A and 216B, into the image processing unit, thus simplifying the machining step.

The reference objects for registration 216A and 216B may be of any shape which is suitable for image recognition, as shown in FIGS. 28A to 28D. The objects as shown in FIGS. 28A to 28D include a component in the direction of X axis, and a component in the direction of Y axis. For example, the focusing on the lowest portion of the V-shaped groove in FIG. 28A or on the top of the inverted V shape in FIG. 28C permits easy detection of the position in image processing.

Embodiment 5

Figure 29:
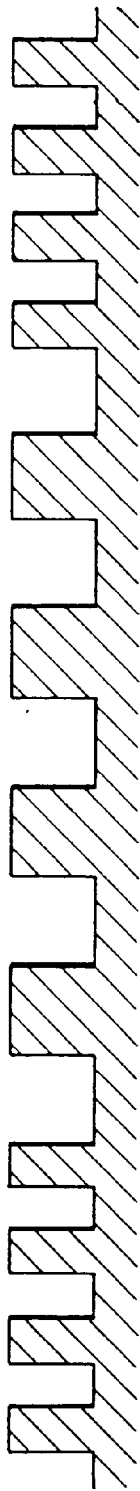
FIG. 29 is a sectional view showing the shape of the reference object for registration provided in still another top plate in accordance with the embodiment of the present invention.
Figure 30:
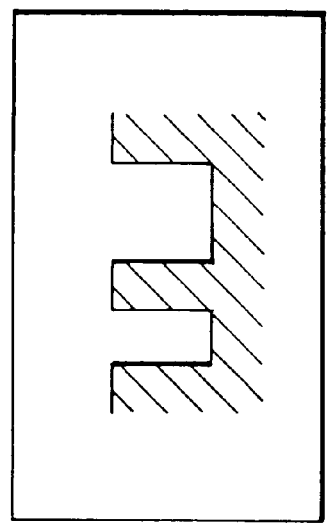
FIG. 30 is a view showing an image of the reference object for registration of the top plate as input into a camera.

In this embodiment, as shown in FIG. 29, the reference objects for registration are formed close to both ends of the top plate at a pitch half of the pitch of a plurality of the grooves for the ink passages. When such a top plate is laid on the support member and the image of the pitched groove obtained with the camera is inputted, the image as shown in FIG. 30 is outputted. A portion showing a variation in the pitch of the groove serves as the reference object for registration. Such reference objects are confirmed by means of the image processing unit and registered with the grooves for the ink passages, whereafter the objective orifices can be formed. Therefore, accurate formation of the orifices becomes possible.

In the embodiments 4 and 5, description has been made under the conditions where orifices will be formed in correspondence to the number of ink passages effective for ejecting ink.

As in the embodiment 5, however, it is evident that the irradiation of laser beam onto portions different in pitch from the ink passages would not lead to the formation of orifices effective for ejecting ink. Accordingly, the number of orifices formed with the laser beam passing through the mask may be larger than the number of the ink passages.

Thus, the registration of the top plate may be performed at any portion, thus permitting a rapid registration and a shortened laser beam machining time. Since no ink is ejected from the reference object for registration, it is preferred to provide the reference object for registration close to both ends of the top plate so that the recording grade will not be deteriorated.

Embodiment 6

Figure 31:
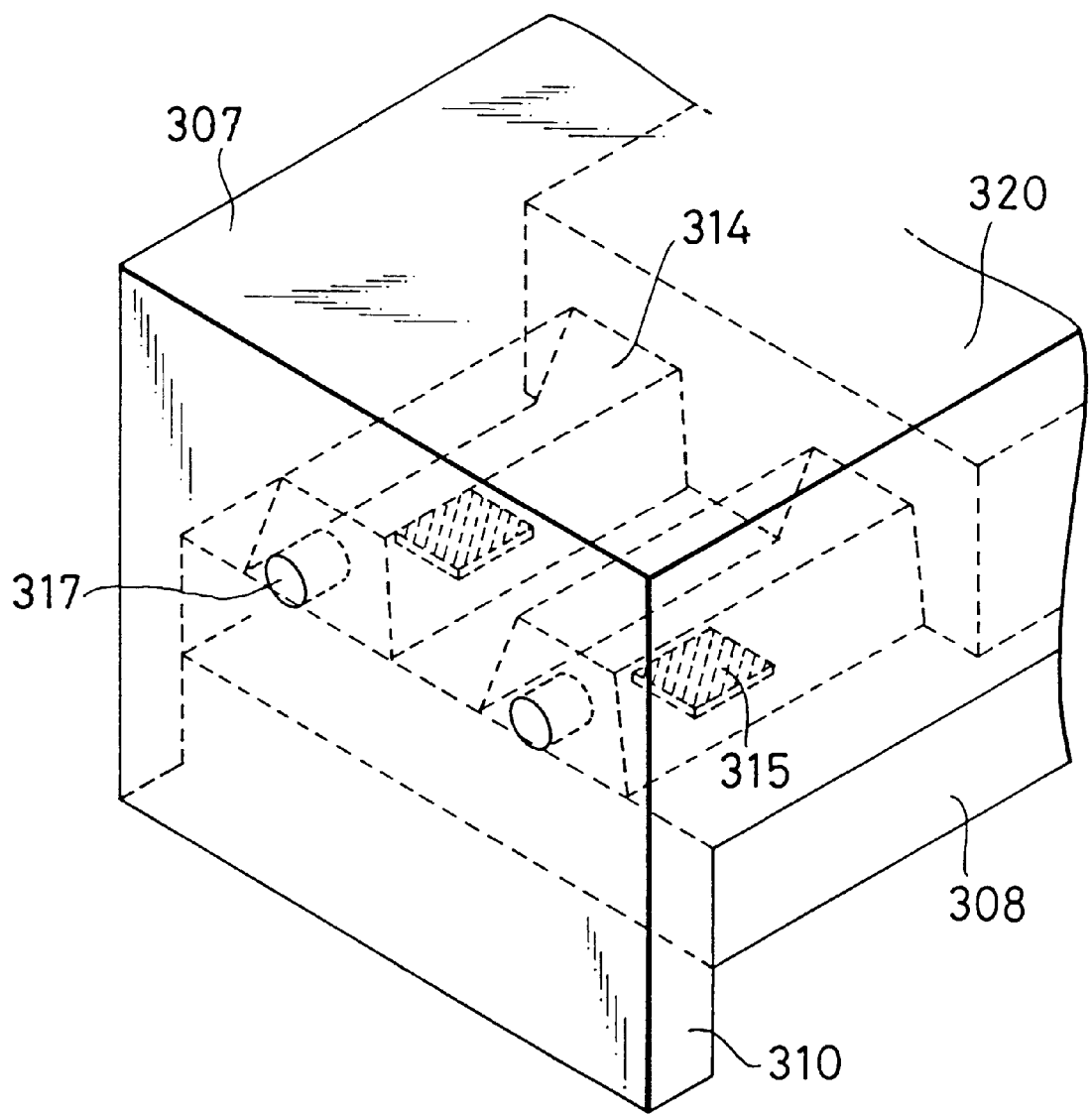
FIG. 31 is a perspective view showing in a simplified manner a part of a recording head produced by the process for producing the ink jet recording head of the present invention.

FIG. 31 is a perspective view showing the outline of an example of the ink jet recording head in accordance with the present embodiment. In this drawing, reference numerals 308 and 315 designate the substrate and the electrothermal converting element, respectively.

Figure 1:
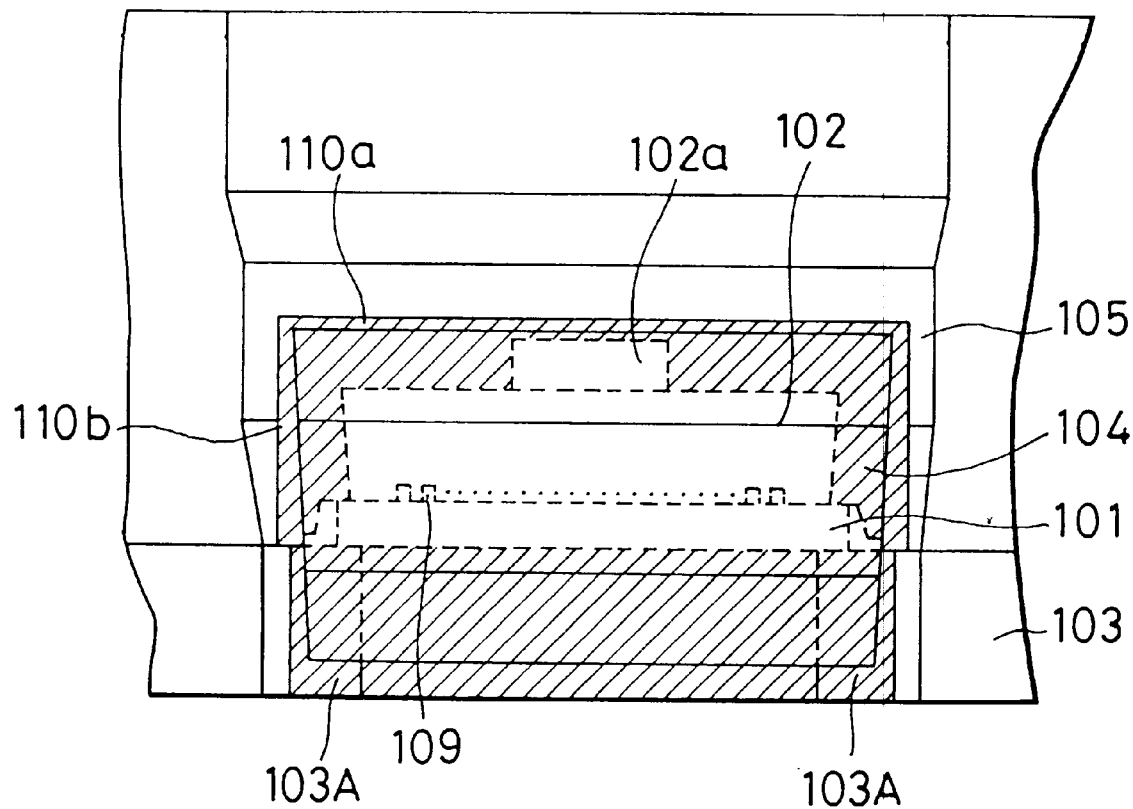
FIG. 1 is a simplified front view showing an example of a conventional ink jet recording head.
Figure 2:
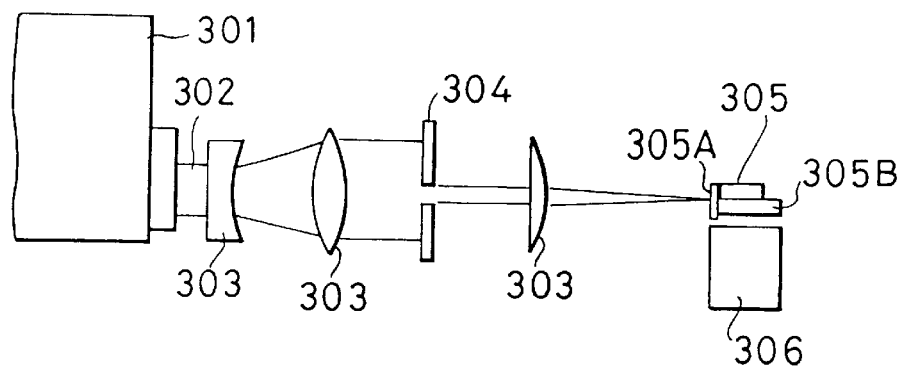
FIG. 2 is a schematic constructional view showing a conventional orifice-processing apparatus in which an orifice is formed by laser beam machining.
Figure 3:
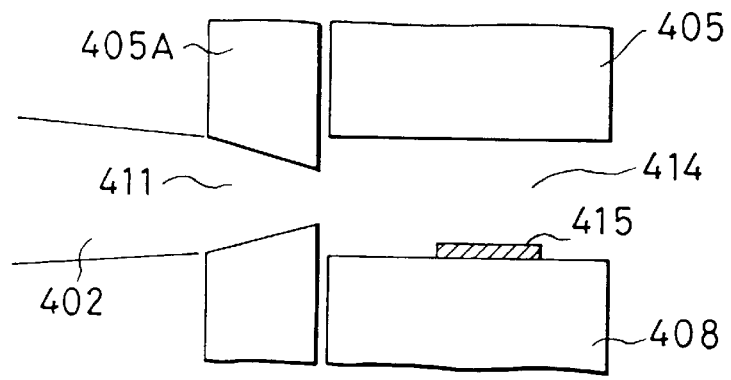
FIG. 3 is a sectional view showing an orifice formed by the laser beam machining apparatus illustrated in FIG. 2.
Figure 4:
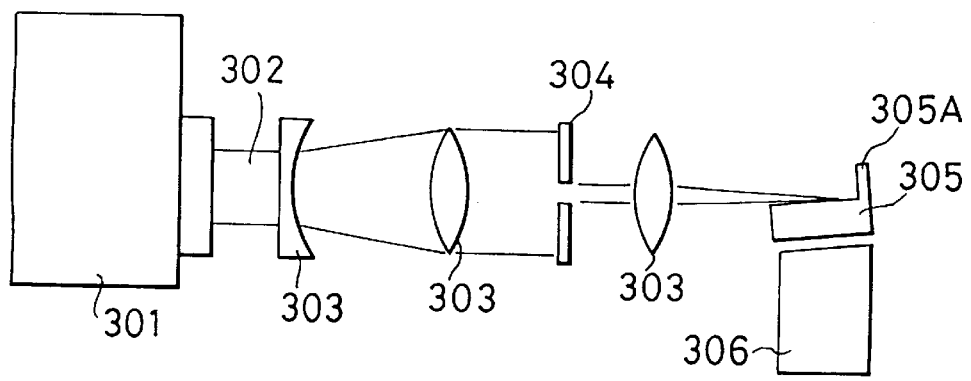
FIG. 4 is a schematic constructional view showing another conventional orifice-processing apparatus in which an orifice is formed by laser beam machining.

In this embodiment, the orifice formation by irradiation of an excimer laser beam from the common liquid chamber 320 side onto the orifice plate 310 integrally formed with the top plate 307 is the same as shown in FIG. 2.

A top plate 307 according to the embodiment 6 has grooves for the ink passages 314, and the orifices 311 formed in an orifice plate 310, the ink grooves 314 and orifices 311 being provided in a desired number (two orifices in FIG. 31 for simplification). The top plate 307 is provided integrally with the orifice plate 310.

Then, the method of forming the groove for the ink passage 314 and the orifice 317 will be described.

The groove for the ink passage 314 can be easily formed in the top plate 307 by use of a resin mold in which a fine groove of an opposite pattern to that of the groove for the ink passage 314 is formed by a technique such as cutting. In the present embodiment, the cross section of the ink passage perpendicular to the direction of ink ejection has a shape broadening progressively toward the joint surface between the substrate 308 and the top plate 307.

Molding is performed under the conditions where no orifice is formed in the mold. As illustrated in FIG. 2, an excimer laser beam is irradiated by a laser oscillation apparatus from the ink passage side of the orifice plate onto a position at which an orifice should be formed, whereby the resin is removed or evaporated to form the orifice.

Figure 32A:
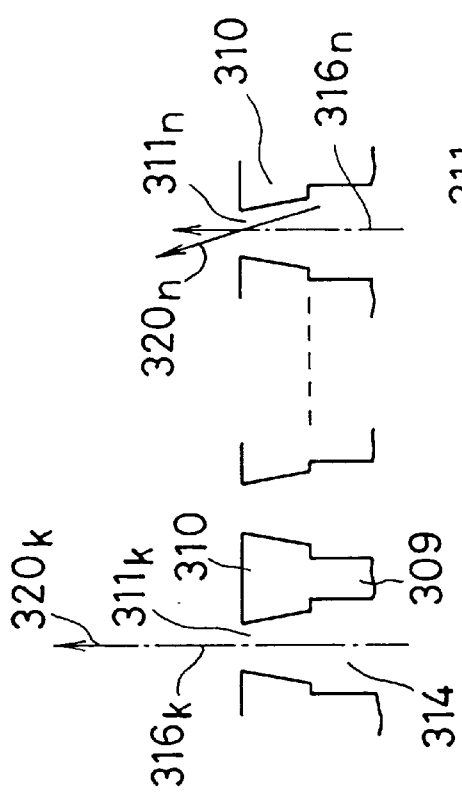
FIGS. 32A, 32B and 32C are explanatory views showing the process for producing the ink jet recording head of the present invention.

FIG. 32 is an explanatory view showing the situation in which the orifice plate 310 is laser beam machined.

Figure 5:
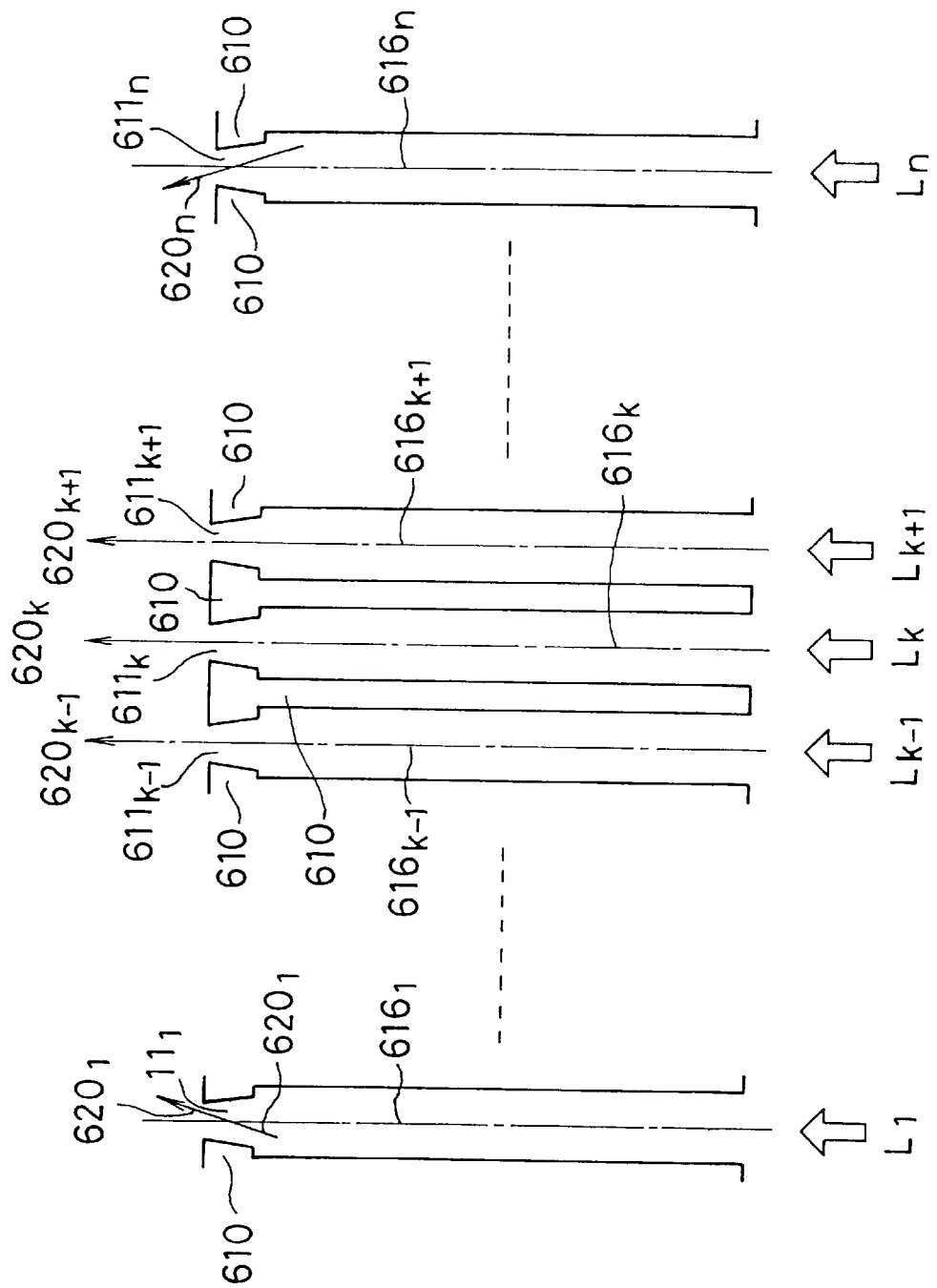
FIG. 5 is a schematic view of an ink jet recording head showing another conventional mode of forming orifices by laser beam machining.

As shown in FIG. 5, an orifice is formed by laser beam irradiated in the direction of the groove for ink passage through the mask. Orifice $311_k$ in the neighborhood of the center of the orifice array is formed as shown at the left end of FIG. 32A. That is, in the shape of the orifice $311_k$, the axis of ejection outlet $320_k$ and the optical axis of laser light $316_k$ coincide. The axis of the orifice $311_k$ at the left end which is formed by laser beam does not conform to the axis of ejection outlet $320_k$ which is indicated by one-dot chain line, as illustrated earlier. Consequently, it is made into a shape different from the shape of the orifice in the neighborhood of the center of the laser beam. Then, the top plate is moved perpendicularly to the central axis of the laser beam, and from the nth orifice $311_n$ to the mth orifice $311_m$ (m>n) are formed using a laser beam.

Figure 32B:
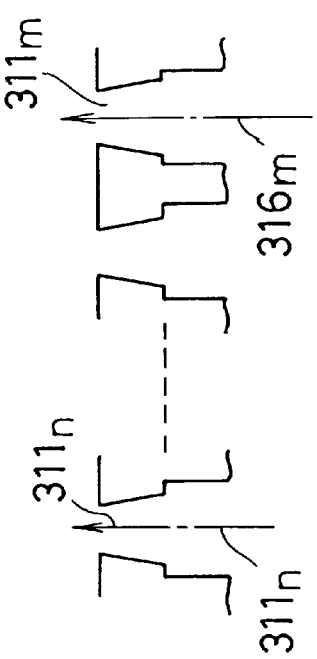
Figure 32C:
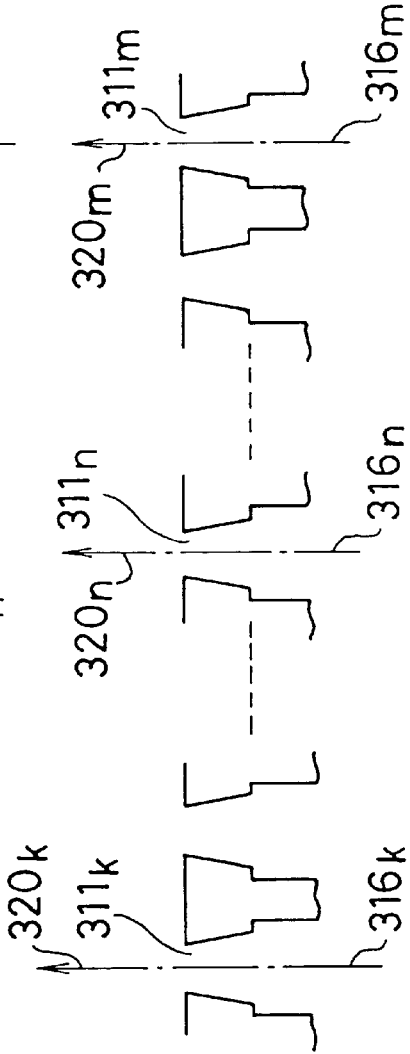

FIG. 32B is an explanatory view showing the situation after the second laser beam machining.

Details of the second laser beam machining will be described with reference to FIG. 33.

Figure 33:
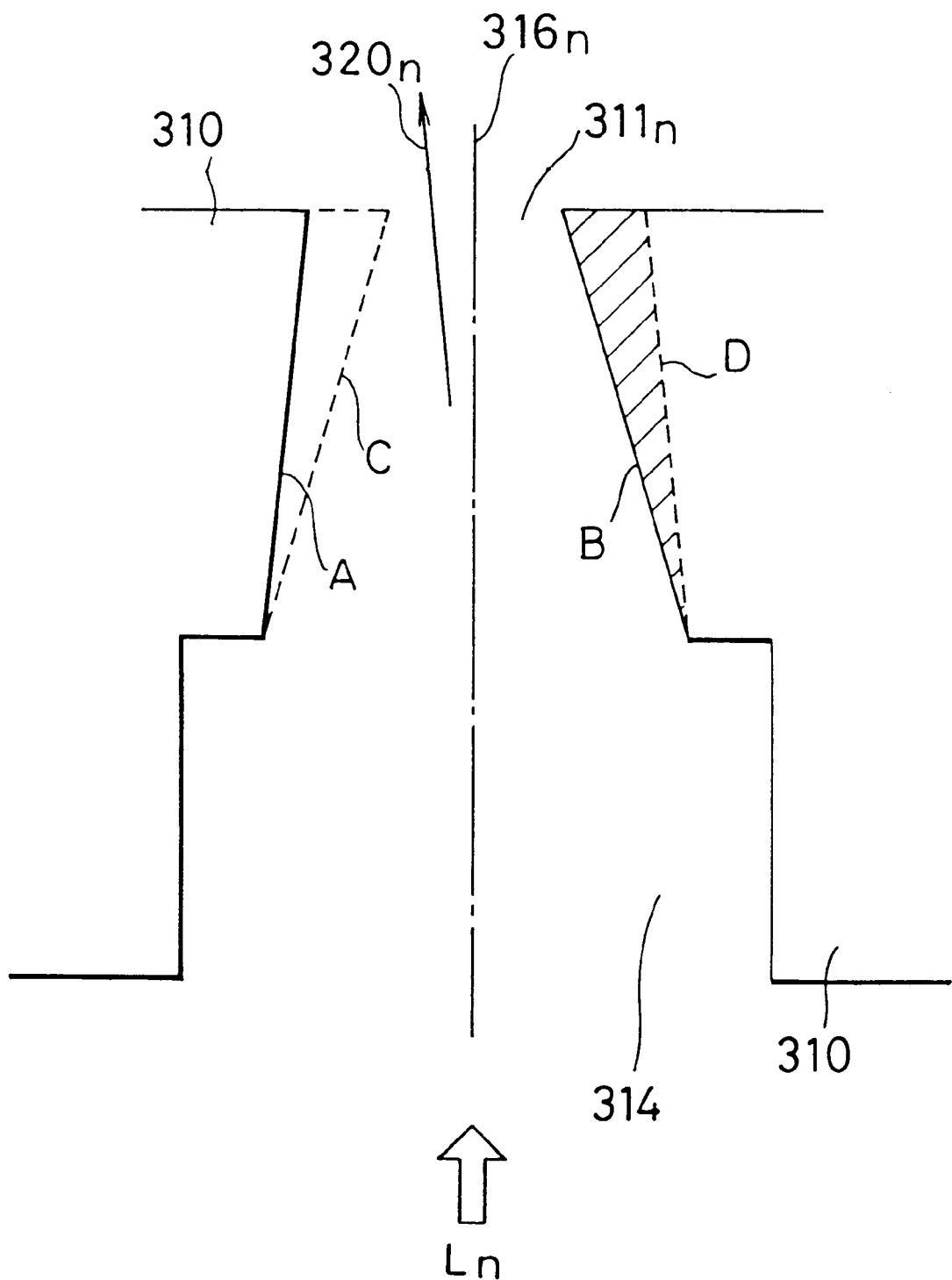
FIG. 33 is an explanatory view showing the process for producing an orifice by irradiating laser beam onto the orifice place in accordance with the embodiment of the present invention.

The irradiation of laser beam $L_n$ results in machining as indicated by lines A and B in FIG. 33. Thus, the optical axis $316_n$ of laser beam $L_n$ does not coincide with the axis of ejection outlet $320_n$. When machining is performed using a laser beam $L_1$, the orifice plate 310 is laser beam machined in a shape as defined by lines C and D, since the gradient of the intensity of the laser beam $L_1$ is opposite to that of the laser beam $L_n$. Accordingly, orifice $311_n$ is formed by laser beam $L_n$ at the first laser beam machining, and formed with the laser beam $L_1$ at the second laser beam machining. After all, the two laser beam machining steps process the orifice plate 310 into a shape as defined by lines A and D. Thus, the optical axis of laser beam and the axis of ejection outlet for ink droplets coincide with each other. Orifice $311_d$ (d<k) (not shown) which is not subjected to two-step laser beam machining is so treated that no laser beam is irradiated onto the orifice plate 310 by disposing a plate material of metal or the like. The axes of ink ejection outlets $320_k$ to $320_m$ of the orifices $311_k$ to $311_m$ coincide with the optical axes $316_k$ to $316_m$ of the laser beam in the orifices $311_k$ to $311_m$ by such two-steps laser beam machining of the orifice plate 310 (see FIG. 32C).

Embodiment 7

The ink jet recording head has a number of orifices for improving recording grade as well as for increasing recording speed.

Figure 34:
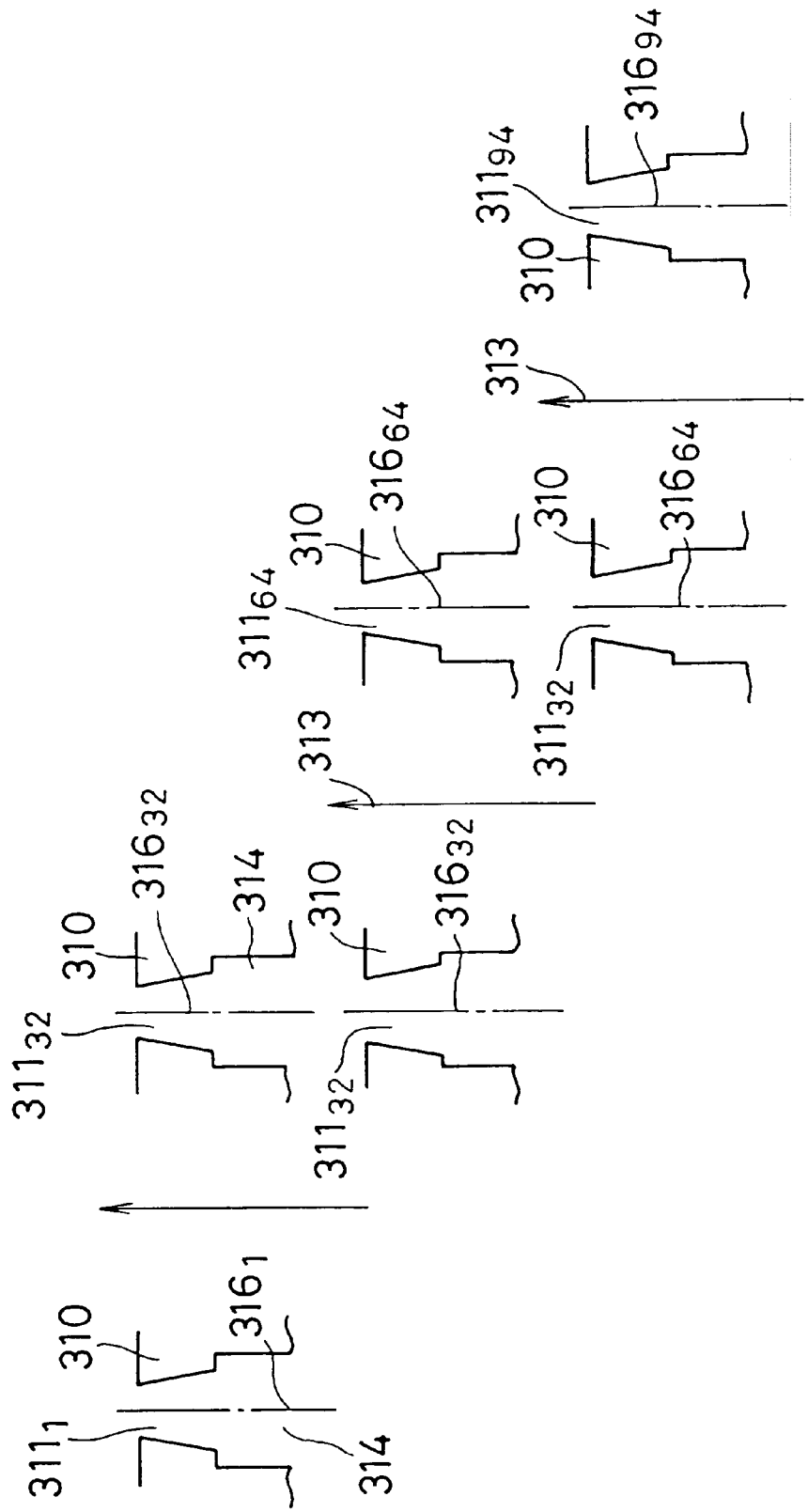
FIG. 34 is an explanatory view showing the method of producing a number of orifices by laser beam machining of the orifice plate in accordance with the embodiment of the present invention.

Next, an explanation will be made for a method of producing an ink jet recording head with such multiple orifices with reference to FIG. 34.

According to this embodiment, a laser beam irradiated from the direction of the groove for the ink passage laser-beam machines an orifice plate 310 to form orifices $311_1$ to $311_{32}$ of a shape as shown in FIG. 5. At this time, the center of the laser beam that has passed the mask lies between orifices $311_{15}$ and $311_{16}$. The orifice $311_{32}$ at the peripheral portion has a shape facing the center of the optical axis because of this characteristic of the optical system.

Then, the top plate is moved only in a direction perpendicular to the optical axis to form the 32nd orifice, $311_{32}$, to the 64th orifice, $311_{64}$. At this time, the center of the optical axis of the entire laser beam lies between the axes of orifice $311_{47}$ and $311_{48}$. As will be described in embodiment 8, the axis of the twice-irradiated 32nd orifice, $311_{32}$, is formed by laser beam machining so as to be symmetrical with respect to the optical axis $316_{32}$. The orifice plate 310 being laser beam machined so that the 63rd orifice, $311_{63}$, will have a shape facing the optical axis $316_{32}$ is the same as the orifice plate 310 being machined by the first laser beam irradiation, so that the 32nd orifice, $311_{32}$, will have a shape facing the optical axis.

The 63rd orifice, $311_{63}$, to the 94th orifice, $311_{94}$, are formed by the same method as described above. In this manner, the orifice plate 310 is laser beam machined successively, making it possible to form a number of orifices symmetrically with respect to the optical axis.

Embodiment 8

Figure 35:
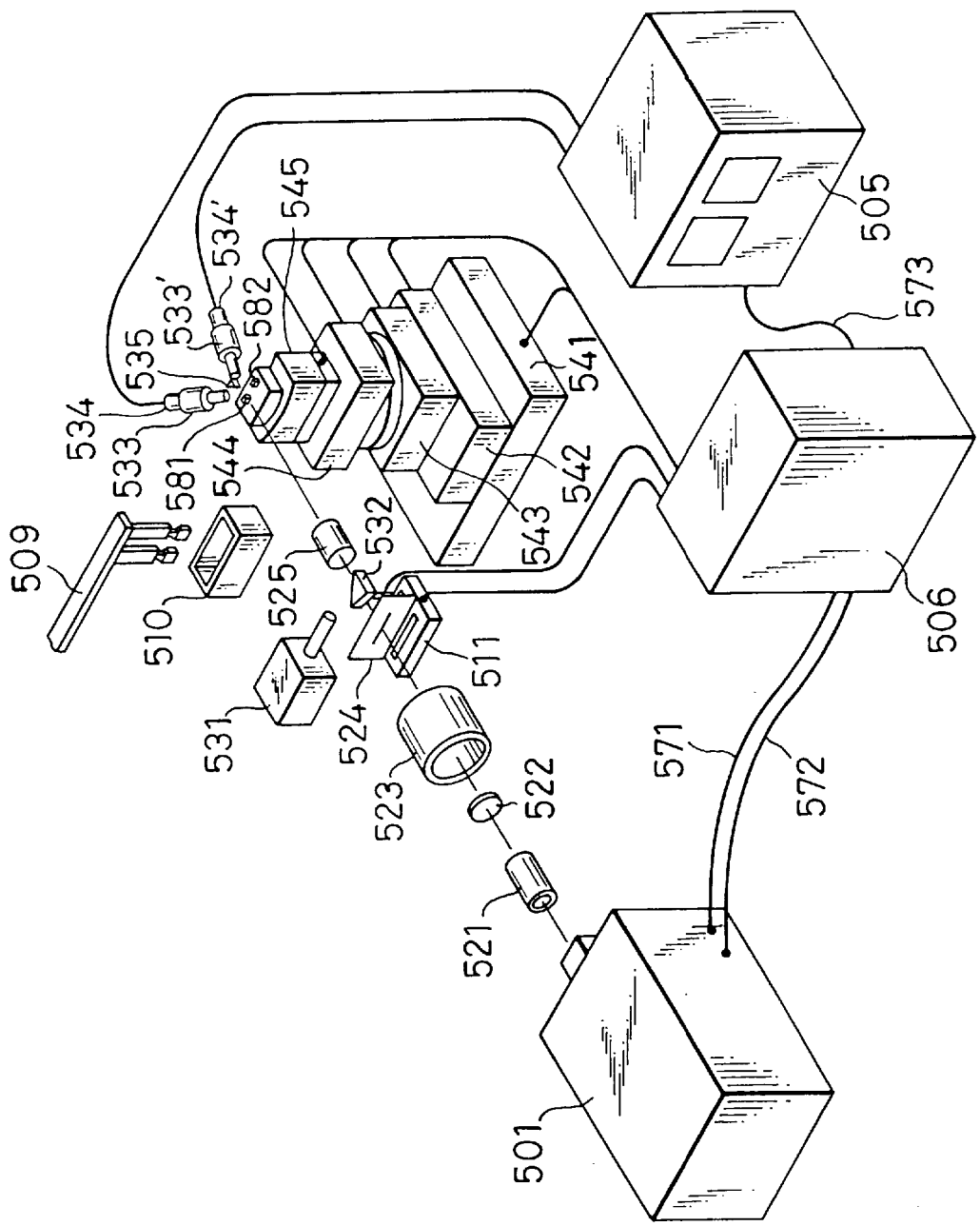
FIG. 35 is a constructional perspective view of an apparatus showing an embodiment of the present invention.

FIG. 35 is a schematic perspective view showing the embodiment of the present invention.

In FIG. 35, the reference numeral 501 designates a laser oscillator, 521 to 525 represent a laser optical system for orifice formation, 531 is an illumination apparatus for observing the orifice plates 581 and 582, and 532 is a reflecting mirror which projects laser beam from the illumination apparatus 531 onto the orifice plates 581 and 582, and which is lowered during irradiation of a laser beam for passing through the orifice plates 581 and 582. Reference numerals 533, 533' are objective lens and lens-barrel for viewing the orifice plates 581 and 582, 534, 534' are ITV cameras, 535 is a triangular mirror for viewing the orifice plates 581 and 582 with right and left observation systems, 541 to 545 represent adjusting stages for registering the orifice plates 581 and 582, 505 is an apparatus for processing an image entered by the ITV cameras 534 and 534', 506 is a control box for controlling the whole apparatuses, 571 is a wiring for controlling the ON/OFF operation of the laser beam, 572 is a communication circuit for controlling the power, etc. of the laser beam, 573 is a communication circuit for controlling or transmitting and receiving data to and from the image processing unit, 509 is a finger for feeding and discharging the orifice plate from a separate container to the adjusting table, or vice versa, and 510 is a box for placing a defective orifice plate therein. The reference numeral 511 is an adjusting stage for moving a mask 524 in the direction of the optical axis of the laser beam.

Figures 36A, 36B:
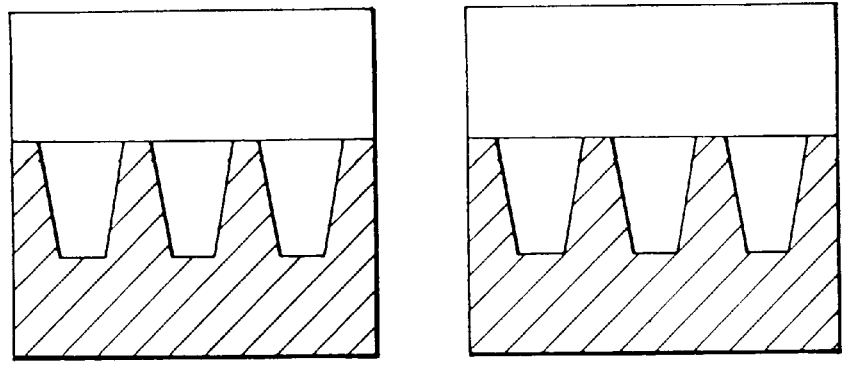
FIGS. 36A and 36B are views showing images of the orifice plate as observed with two ITV cameras in the present invention.

FIGS. 36A and 38B are schematic views showing images of both ends of the orifice plates as viewed with the ITV cameras 534 and 534', respectively.

Figure 37:
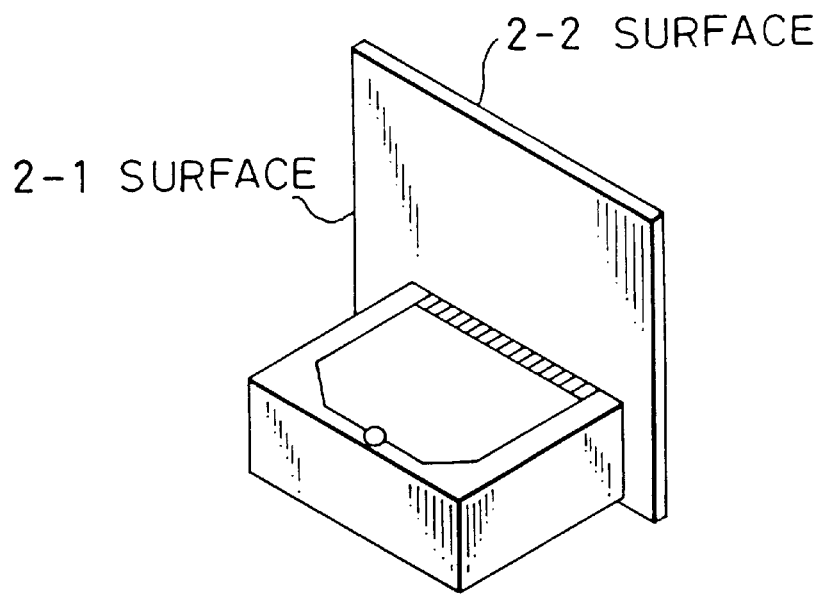
FIG. 37 is a simplified perspective view of an orifice plate.

These images are obtained when focusing on the 2-1 surface of the orifice plates as shown in FIG. 37. The position of this inverted trapezoidal groove is registered with the position of laser irradiation by means of the adjusting stages 541 to 545. The mirror for illumination 532 is lowered upon registration of both positions, and a laser beam is irradiated to perforate an orifice in an orifice plate disposed in front of the groove.

Figure 38:
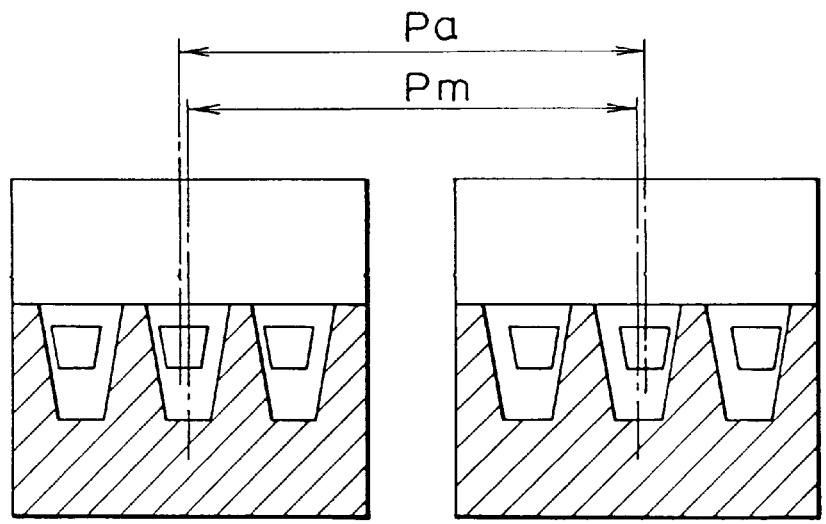
FIG. 38 is a view showing images of the orifice plate observed with two ITV cameras in the present invention.

FIG. 38 is a schematic views showing images of the orifice plates as observed with the two ITV cameras.

In FIG. 38, Pm denotes the distance between the ink passages, while Pa represents the distance between the orifices.

Figure 39:
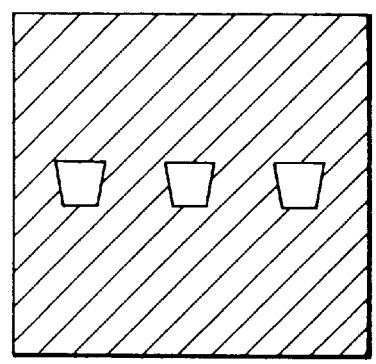
FIG. 39 is an image of the orifice plate as viewed by focusing only on these orifices using an ITV camera.

Focusing the observation system on the 2-2 surface as shown in FIG. 37 gives an image of only orifices as shown in FIG. 39. For example, the diameter or area of the orifice can be determined easily by observing the picture elements of the orifice image.

Figure 40:
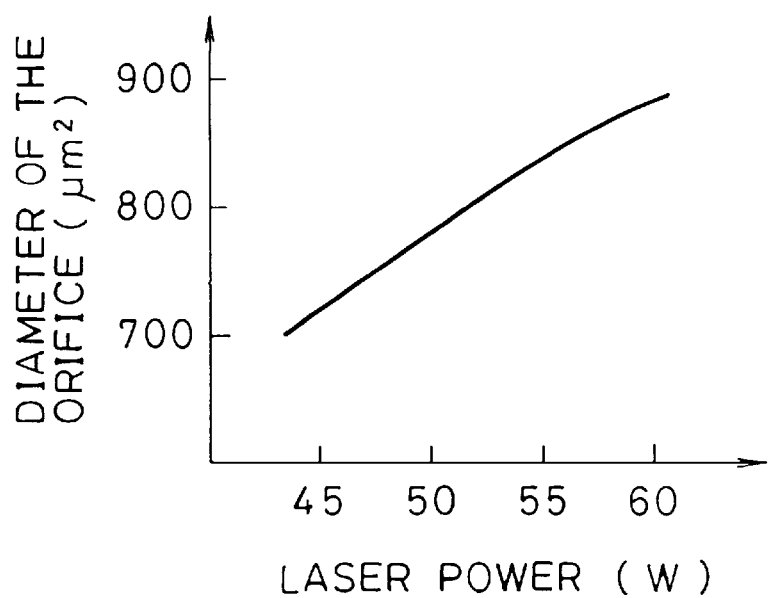
FIG. 40 is a characteristic graph showing the relationship between the laser power and the area of the orifice in laser beam machining.
Figure 41:
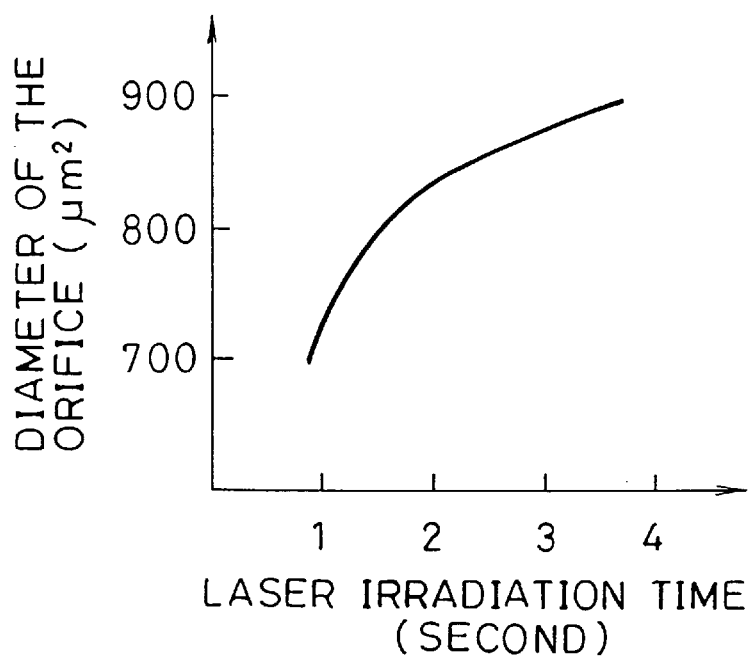
FIG. 41 is a characteristic graph showing the relationship between the laser irradiation time and the area of the orifice in laser beam machining.

If the area of the orifice so determined is not within the prescribed range, it is possible to perform laser beam machining so as to obtain the desired diameter or area of the orifice by controlling the laser power and/or the irradiation time on the basis of a characteristic graph showing the laser power vs. the orifice area as shown in FIG. 40, or a characteristic graph showing the laser irradiation time vs. the orifice area as shown in FIG. 41.

The above-described construction can be applied to the examination of the orifice machined by the laser beam. The diameter or area of the orifice formed are measured in detail. If the orifice plates are outside the specifications, the defective orifice plate is dropped into the discharge box 510 during its discharge or accommodation automatically and by use of the finger 509, thus permitting the elimination of defective orifice plates.

When the variations in the laser power and the wall thickness of the orifice plate are relatively stably small, the operation of the apparatus can be improved by confirming the orifice diameter once after laser beam machining is performed at plural times.

Embodiment 9

In the present embodiment, a construction in which varies in the interval between grooves of the ink passages can be coped with and the orifices can be formed accurately without decreasing the operating efficiency will be described with reference to FIG. 38.

Figure 42:
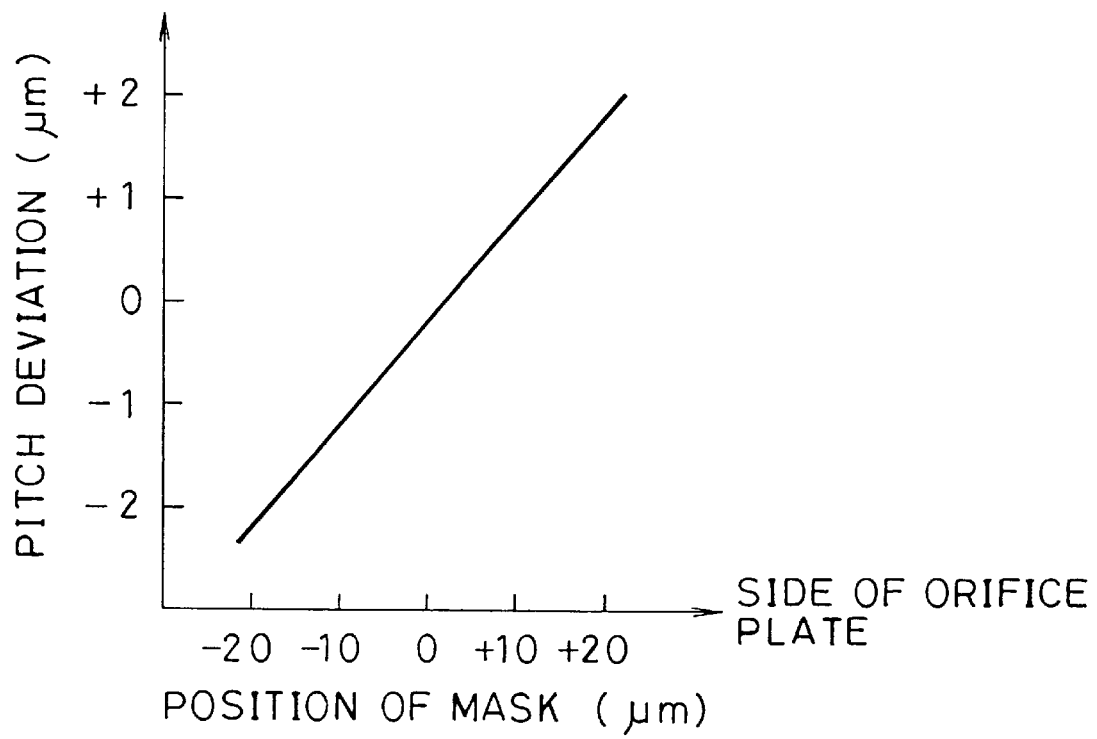
FIG. 42 is a characteristic graph showing the relationship between the position of the mask and the pitch deviation between the groove and the orifice in laser beam machining.

In FIG. 38, Pm and Pa are measured with the image processing unit 505. If Pm and Pa deviate from the specifications, the mask adjusting stage 511 is moved in the direction of the optical axis to calibrate the deviation. A characteristic view showing the position of the mask and the deviation of the pitch is given as FIG. 42. This calibrating procedure is performed at each laser beam machining or for each lot (whenever the orifice plate may be changed) or after a predetermined number of laser beam machinings, depending on the degree of variations in the orifice plate. Thereby, accurate orifice formation becomes possible without decreasing the operating efficiency of the apparatus or without discriminating the orifice plate.

The above construction is applicable to inspection of the deviation of the laser beam machined orifice from the groove.

Pm and Pa as shown in FIG. 38 are measured with the image processing unit 50 after orifice formation. If the orifice plates are outside the specifications, the defective orifice plate is dropped into the discharge box 510 during its discharge or accommodation automatically or by use of finger 509, thus permitting the elimination of defective orifice plates.

If there are large variations in the groove distances between the ink passages as another embodiment, it results in inconsistency between the center of each orifice formed in the groove and the center of laser beam in each orifice. Thus, the orifice plate for examination should be perforated not in the grooves as in FIG. 38, but thereby obtaining accurate distances between the orifices in the upper part of the grooves. Of course, the measurement for this purpose should be performed after a certain number of laser beam machinings, and the orifice plates with such defects are rejected as defective.

The laser beam for use in the embodiments 2 to 9 may be various types of laser beam, but an excimer laser with high output in the ultraviolet region is used preferably.

In comparison with customary lasers for machining (YAG laser, $CO_2$ laser, etc.), an excimer laser has the following characteristics.

1) An excimer laser has a very short wavelength. Because of a high photon energy (e.g. a quantum energy of 6.4 eV in ArF laser beam with a wavelength of 193 nm, a quantum energy of 4.9 eV in KrF laser light with a wavelength of 248 nm), a photochemical reaction utilizing electron transition can be induced effectively, thereby lowering the temperature for laser beam machining.

2) An excimer laser has a high resolution. Because of a short oscillation wavelength, the breadth of diffraction is small, thus permitting laser beam machining with a high resolution (<1 $\mu$m).

3) Large-area irradiation of an excimer laser is possible. Unlike ordinary lasers, an excimer laser oscillates with a very higher transverse multimode (mode number: up to $10^5$), thus keeping low the contrast of a spectrum produced by the interference of the laser beam. Hence, a sharp image can be obtained, when, for example, pattern transfer is performed via the mask.

The excimer laser is capable of oscillating ultraviolet rays and is advantageous in terms of high intensities, satisfactory monochromatic properties, directivities, short-pulse oscillations and lens-assisted convergence giving a very high energy density.

An excimer laser oscillator is an apparatus capable of oscillating short-pulse (15–35 ns) ultraviolet rays by exciting a mixture of a noble gas and a halogen gas upon discharge. Common examples of the excimer laser are Kr-F, Xe-Cl and Ar-F lasers. Their oscillation energy is several hundred mJ/pulse, and their pulse frequency is 30–1,000 Hz.

When the short-pulse ultraviolet light with a high luminance such as an excimer laser beam, is irradiated onto the surface of a polymer resin, there occurs an ablative photo-decomposition (ADP) process in which the irradiated portion decomposes and scatters instantaneously with plasma light emission and a crashing sound. This process enables the polymer resin to be processed.

Comparisons will be made between the accuracy and precision of machining by an excimer laser and those of other lasers. For example, an excimer laser and other lasers such as YAG laser or $CO_2$ laser are irradiated onto a polyimide film. In this case, that wavelength for polyimide film at which the light is absorbed is in the UV region, so that a clearly demarcated hole is opened by a KrF laser. With a YAG laser with wavelengths outside the UV region, on the other hand, a hole is opened, but its edge surface becomes rough. A $CO_2$ laser of infrared rays produces craters around a hole formed.

Chrome stainless steels, opaque ceramics and Si are not affected by the irradiation of excimer laser beam in the open air atmosphere. Therefore, they can be used as masking materials for machining by excimer laser.

FIGS. 43 to 47 are explanatory views for illustrating an ink jet unit (IJU), an ink jet head (IJH), an ink tank (IT), an ink jet cartridge (IJC), an ink jet recording apparatus body (IJRA), and a carriage (HC) which are preferred for the application of the present invention, and the relationships among these constituent members. Each component structure will be described with reference to these drawings.

Figure 43:
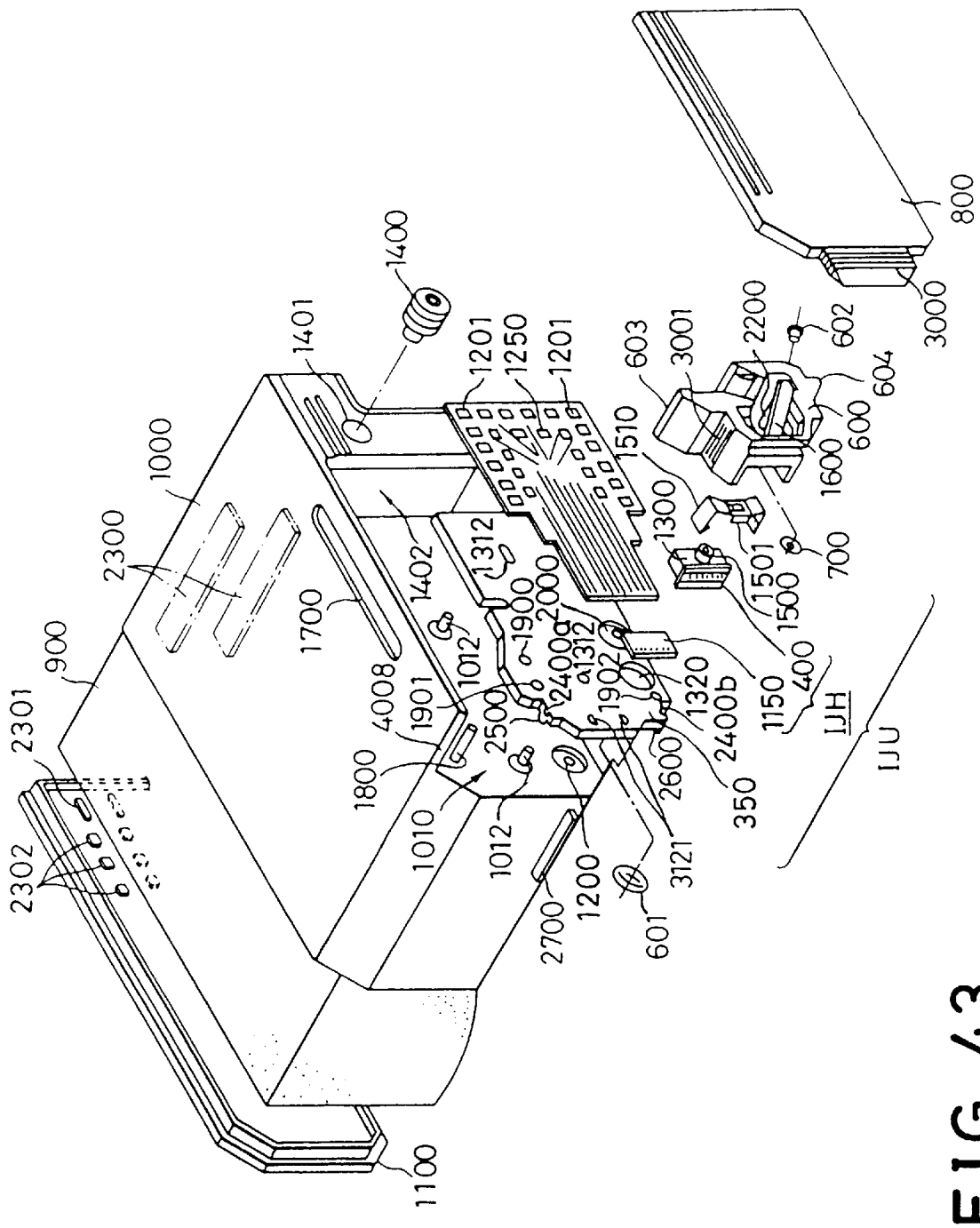
FIG. 43 is an exploded perspective view of an example of an ink jet cartridge to which the present invention has been applied.
Figure 44:
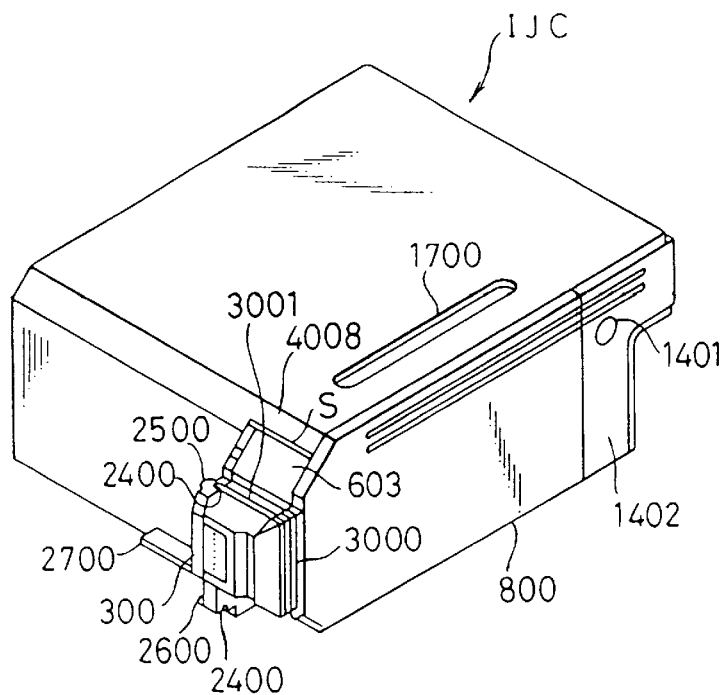
FIG. 44 is a perspective view of an ink jet cartridge to which the present invention has been applied.

The ink jet cartridge (IJC) in the present embodiment, as seen from the perspective view of FIG. 44, has a large capacity for accommodating the ink, and has such a shape that a front end portion of the ink jet unit IJU projects slightly from the front face of the ink tank IT. This ink jet cartridge IJC is fixed and supported by a positioning means and an electric contact (to be described later) of the carriage HC (FIG. 46) which is laid on the ink jet recording apparatus body IJRA. The ink jet cartridge IJC is also of a disposable type detachable from the carriage HC. FIGS. 43 to 47 show constructions to which a number of novel techniques achieved during the establishment of the present invention have been applied. The whole constitution of the present invention will be described along with a brief explanation for these constructions.

(i) Construction of the ink jet unit IJU

The ink jet unit IJU is a unit of an ink jet apparatus in which an electro-thermal converting element generates thermal energy to produce film boiling in the ink for performing recording in response to an input electric signal.

In FIG. 43, the reference numeral 1150 denotes a heater board composed of electro-thermal converting elements arranged in an array geometry on a silicon substrate and an electric wiring made of aluminum which supplies an electric power to the electro-thermal converting elements, the constituent elements being formed by a film forming technology. Reference numeral 1250 denotes a wiring substrate connected to the heater board 1150 formed a wiring corresponding to the wiring of the heater board 1150 (these wirings are connected together, for example, by wire bonding), and pads 1201 located at an end portion of the wiring for receiving electric signals from the apparatus body.

Reference numeral 1300 denotes a grooved top plate provided with partitions for defining individual an ink passage and a common liquid chamber for accommodating the ink to feed the ink to each ink passage and so forth. The grooved top plate 1300 is a one-piece molded product consisting of the ink receptacle port 1500 for receiving the ink supplied from the ink tank IT and introducing the ink into the common liquid chamber, and an orifice plate 400 having a plurality of ink ejection outlets corresponding to the respective ink passages. Although the preferred material for the one-piece molded product is polysulfone, another kind of molding resin may be acceptable.

Reference numeral 350 denotes a support member made of, that is, a metal which supports the reverse side of the wiring substrate 1250 by a flat surface thereof, and which defines a bottom of the ink jet unit. Reference numeral 500 denotes a presser spring shaped like a letter M. The presser spring 500 slightly presses the common liquid chamber with the center of the presser spring in a shape of the letter M, and at the same time,. its apron portion 1501 presses a portion of the ink passage, preferably, a region in the neighborhood of the ejection outlet, with a linear pressure generated when a force is concentrated at the apron portion 1501. Legs of the presser spring 500 penetrate through holes 3121 of the support member 350 and are fixed in the reverse side of the support member 350 so that the heater board 1150 and the top plate 1300 are held between the presser spring 500 and the support member 350. That is, the heater board 1150 and the top plate 1300 can be fixed and contacted to each other by a rebound force generated with the presser spring 1510 and its apron portion 1501.

The support member 350 has locating holes 1312, 1900 and 2000 into which the locating protrusion 1012 and protrusions 1800, 1801 for locating and supporting by heat fusion are inserted respectively. These protrusions 1012, 1800 and 1801 are provided on the ink tank IT. The support member 350 has protrusions 2500 and 2600 for locating the carriage HC of the apparatus body IJRA in its rear side. In addition, the support member 350 has a hole 1320 through which an ink supply pipe 2200 (to be disclosed later) of capable of supplying ink from the ink tank IT is inserted. The mounting of the wiring substrate 1250 on the support member 350 is performed by bonding with an adhesive or the like. Concave portions 2400a and 2400b of the support member 350 are provided in the neighborhood of the locating protrusions 2500 and 2600, respectively. In the assembled ink jet cartridge IJC (see FIG. 44), the concave portions 2400a and 2400b are located on the extension line from the apex portion of the recording head unit IJU, three sides of which are defined by a portion having a plurality of parallel grooves 3000 and 3001. Therefore, the concave portion 2400 makes it possible to keep unfavorable dust and ink sludge away from the protrusions 2500 and 2600. As will be seen from FIG. 46, a cover member 800 on which the parallel grooves 3000 are formed constitutes an outer wall of the ink jet cartridge IJC and defines a space for accommodation of the ink jet unit IJU together with the ink tank. An ink supply member 600 having another parallel grooves 3001 includes an ink conduit 1600 which is arranged as a cantilever with its fixed end on the side of the ink supply pipe 2200 and is connected to the ink supply pipe 2200. A sealing pin 602 is inserted into the ink conduit 1600 for securing a capillary action between the fixed end of the ink conduit 1600 and the ink supply pipe 2200. In addition, reference numeral 601 denotes a packing for sealing a joint portion between the ink tank IT and the ink supply pipe 2200. In addition, reference numeral 700 denotes a filter placed at the end portion of the ink supply pipe 2200 on the side of the ink tank IT.

Since the ink supply member 600 is molded, it is attained at a low cost and is finished with positional accuracy, thus increasing in the accuracy and precision of production of the ink supply member 600. Furthermore, it is possible to keep a stable state pressure welding the ink conduit 1600 onto the ink receptacle port 1500 in mass production in the ink supply member 600 of the ink supply member 600 owing to the cantilever structure of the ink conduit 1600. In this embodiment, it is possible to secure a perfect ink flow path without leakage only by pouring a sealing adhesive from the ink supply member side under the conditions of pressure welding. The fixing of the ink supply member 600 to the support member 350 is performed easily by putting pins (not shown) at the rear side of the ink supply member 600 into holes 1901, 1902 of the support member 350, and bonding the protruding portions of the pins with the rear face of the support member 350 by heat fusion method. These heat-bonded slight projections of the pins are held in a relevant concave portion (not shown) on the side surface of the ink tank IT where the ink jet unit IJU is mounted. Thus, the positioning side of the ink jet unit IJU is fixed correctly with the ink tank IT.

(ii) Structure of the ink tank IT

The ink tank IT is composed of a cartridge body 1000, an ink absorber 900, and a cover plate 1100. The cover plate 1100 is used to seal the ink absorber 900 after inserting the ink absorber 900 into the cartridge body 1000 from the opposite side of the cartridge body 1000 to its surface where the ink jet unit IJU is mounted.

The ink absorber 900 is used to be impregnated with ink and placed in the cartridge body 1000. Reference numeral 1200 denotes an ink supply port for supplying ink to the ink jet unit IJU comprising of the above-mentioned components 100 through the ink supply member 600. In addition, the port 1200 is used as an inlet for pouring ink into the absorber 900 and impregnating with ink prior to disposing the ink jet unit IJU at a portion 1010 of the cartridge body 1000.

In this embodiment, the ink can be supplied into the ink tank IT through a port communicating to an atmospheric air 1401 or said ink supply port 1200. However, it is important to pour ink through the ink supply port 1200 for the purpose of pouring ink into the absorber 900 relatively efficiently and uniformly. This is because the empty space filled with air in the ink tank IT, which is composed of ribs 2300 in the cartridge body 1000 and partial ribs 2400 and 2500 of the cover plate 1100 in order to supply ink efficiently from the absorber 900, occupies a corner space communicating with the port 1401 and being the most distant from the ink supply port 1200. This manner of ink supply is very effective for practical use. The cartridge body 1000 has four ribs parallel to the moving direction of the carriage. These four ribs are arranged on the rear surface of the cartridge body 1000 so as to prevent the absorber 900 from contacting the rear surface of the cartridge body 1000 of the ink tank. The partial ribs 2400 and 2500 are also placed on the inner surface of the cover member 1100 positioned on the extension line from the ribs 2300. In contrast with the rib 2300, the partial ribs 2400 and 2500 are composed of many small pieces so that their volume of empty space filled with air becomes larger than that for the ribs 2300. The partial ribs 2500 and 2400 are distributed over a half or less of the whole area of the cover member 1100. With these ribs, the flow of ink from the corner region of the ink tank IT most distant from the ink supply port 1200 is stabilized, so that the ink can be introduced securely from every region of the absorber 900 into the ink supply port 1200 by capillary action. The port communicating to an atmospheric air 1401 is an open hole provided in the cover member 1100 for communicating the inside of the cartridge with the atmosphere. Reference numeral 1400 denotes a water repellent disposed inwardly of the port communicating to an atmospheric air 1401 for preventing ink leakage from this port 1401.

That space of the ink tank IT where ink is accommodated is a rectangular parallelepiped whose longer side corresponds to the side of the ink tank IT. Hence, the layout of the ribs as described above is effective particularly in this case. If the ink tank IT has its longer side in the direction of the movement of the carriage or has a cubic space for ink accommodation, the supply of ink from the ink absorber 900 can be stabilized by providing the ribs on the whole area of the cover member 1100. A rectangular parallelepiped shape is suitable for accommodating as much ink as possible in a limited space. It is important to provide ribs 2300, 2400 and 2500. This can achieve the above effect at two side areas in the neighborhood of corners of the ink tank IT to use the accommodated ink without waste for recording. In addition, the inside ribs of the ink tank IT are almost uniformly distributed in the thickness direction of the ink absorber 900 in a rectangular parallelepiped shape. This arrangement is important for enabling an atmospheric pressure to be applied uniformly on the ink retained in the ink absorber 900 so that the ink in the ink absorber 900 can be used up leaving the least amount of waste ink. Furthermore, the technological concept of positioning of the ribs will be described in detail below. Let it be assumed that the ink supply port 1200 of the ink tank is projected onto the top quadrilateral side of the rectangular parallelepiped. When a circular arc is drawn with the length of the longer side of the ink tank IT as its radius as the center of the position of the projection. Here, it is important that the ribs be disposed on a plane outward of the circular arc so that an atmospheric pressure rapidly applies to the ink absorber 900 positioned outwardly of the circular arc. The port communicating to atmospheric air 1401 is not restricted to the position of the embodiment as long as it can introduce atmospheric air into the area where the ribs are disposed.

In addition, in this embodiment, the rear surface of the ink jet cartridge IJC is made plane so that the space required to incorporate the cartridge IJC of the apparatus is minimized, and the amount of ink accommodated is maximized. As a result, the size of the apparatus is made smaller, and the replacement frequency of the ink jet cartridge can be reduced. Furthermore, a projected portion for providing the port communicating to atmospheric air 1401 is formed by utilizing the rear portion of the space for integrating the ink jet unit IJU to the ink tank IT. Inside the projected portion, a hollow is formed in which a space 1402 for applying an atmospheric pressure to the entire thickness of the ink absorber 900 is provided. An unprecedentedly excellent ink cartridge can be provided by constructing as mentioned above. The space 1402 for applying an atmospheric pressure is much larger a space than that of a conventional apparatus. Since the port communicating to an atmospheric air 1401 is located in its upper side, the space 1402 can temporarily hold the ink even if the ink leaks accidentally from the ink absorber 900. The space 1402 can retrieve the ink into the absorber 900 reliably.

Figure 45:
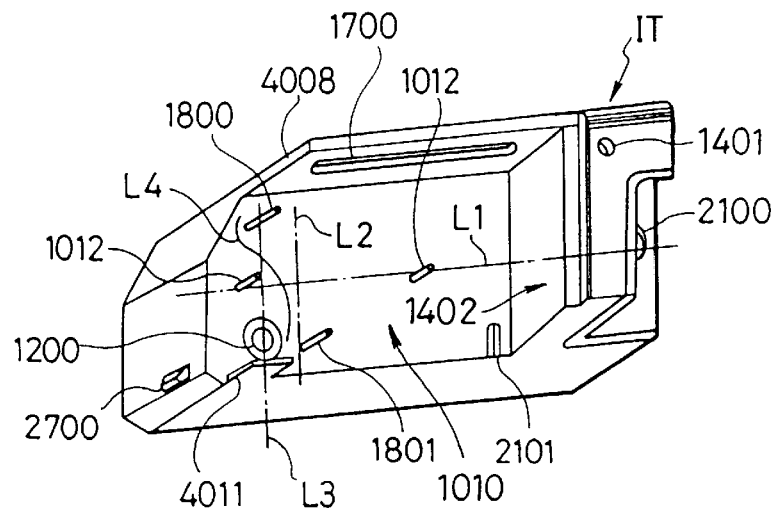
FIG. 45 is a perspective view of an ink tank of the ink jet cartridge as viewed from the side where the ink jet recording head is mounted.

A structure of the mounting face of the ink tank IT to which the unit IJU is mounted is shown in FIG. 45. When a line $L_1$ is taken to be a straight line passing through the center of the ink ejection outlet of the orifice plate 400 and parallel to the bottom face of the ink tank IT or to the reference plane on the surface of the carriage, the protrusion 1012, for registration to be engaged with the hole 1312 of the support member 350 are on the line $L_1$. The height of the protrusion 1012 is a little less than the thickness of the support member 350, and the support member 350 is positioned with respect to the protrusion 1012. On the extension line $L_1$, as shown in FIG. 45, a click 2300 is disposed for engaging with a right angular hook surface 4002 of a locating hook 4001 which is provided on the carriage. Hence, an action force for positioning the cartridge is applied to a surface region including the line $L_1$ and parallel to the reference face as mentioned above. As will be explained with reference to FIG. 47, this layout relationship forms an effective structure to make the accuracy of positioning only the ink tank equivalent to that of positioning the ink ejection outlet of the ink jet recording head.

In addition, the length of the protrusions 1800, 1801 to be inserted in the holes 1900, 2000 for fixing the support member 350 to the side surface of the ink tank IT is greater than that of the protrusion 1012 as mentioned above. The projections 1800, 1801 are used for fixing the support member 350 on the side surface of the ink tank IT by penetrating through the holes 1900, 2000 of the support member 350 and by bonding an end portion of the protrusions 1800, 1801 with the support member 350 by a heat fusion method. Let $L_3$ be a straight line intersecting perpendicularly with the straight line $L_1$ and passing the protrusion 1800, and let $L_2$ be a straight line intersecting perpendicularly with the straight line $L_1$ and passing the protrusion 1801. Nearly the center of the ink supply port 1200 as mentioned above is positioning on the straight line $L_3$, so that, the protrusion 1800 acts for stabilizing the state of connection situation between the ink supply port 1200 and the ink supply pipe 2200 so as to make it possible to reduce an overload on this connection situation in the case of their dropping and/or shock to them. Since the straight lines $L_2$ and $L_3$ do not intersect at any point, and there are protrusions 1800, 1801 in the neighborhood of the protrusion 1012 at the side of the ink ejection outlet of the head IJH, a reinforcement effect acts for positioning the head IJH on the ink tank IT. A curve $L_4$ shows a position of an outside wall of the ink supply member 600 when the member 600 is mounted. Since the protrusions 1800, 1801 are disposed along the curve $L_4$, they provide enough high strength and dimensional accuracy by applying the weight load of the structure at the front end side of the head IJH. Reference numeral 2700 denotes a nose flange of the ink tank IT which is inserted into a hole in a front plate 4000 of the carriage so as to prevent an abnormal situation in which the displacement of the ink tank becomes extremely large. Reference numeral 2101 designates a stop for preventing the cartridge IJC from slipping off the carriage HC, and is placed in correspondence to a bar (not shown) of the carriage HC. With this arrangement, when the cartridge IJC is mounted by being turned on the carriage as will be described later, the stop 2101 enters into a lower side of the bar, so that, the cartridge IJC maintains its position even if such an accidental upward force as separating the cartridge IJC from its normal mounting position acts on the cartridge IJC.

The unit IJU is mounted inside of the cartridge IJC, and then is closed with the cover 800 so that the unit IJU is surrounded by the cartridge IJC except an underside of the cartridge IJC. However, this underside opening is close to the carriage HC when the cartridge is mounted on the carriage HC, thereby establishing a substantially perfectly closed space around the unit IJU. Accordingly, although heat generated from the head IJH within this closed space is effective as a heat jacket, the temperature of the closed space increases slightly during long-term continuous use of the head IJH. In this embodiment, therefore, a slit 1700 with a smaller width than that of the closed space is formed in the upper deck of the cartridge IJC for promoting a natural heat dissipation from the support member 300. Besides, the slit 1700 can establish an uniform temperature distribution in the whole unit IJU irrespective of the environment for preventing an increase of temperature within the closed space.

By assembling the cartridge IJC from the ink tank IT and the unit IJU, the ink can be fed from the ink tank IT into the ink supply tank 600 through the ink supply port 1200, the hole 1320 of the support member 350, and an inlet provided on a rear surface of the supply tank 600. After the ink passes through the inside of the supply tank 600, the ink flows into the common liquid chamber through a suitable supply tube and the ink inlet 1500 of the top plate 1300 from the ink outlet of the supply tank 600. The gaps formed at connecting portions of these components for supplying ink are filled with a packing such as a silicone rubber or butyl rubber for sealing the gaps, and an ink feed route is thus secured.

As described above, the ink supply member 600, the single module of the top plate with the orifice plate and the ink tank body 1000 constitute a one-piece molded product. Therefore, a high accuracy of assemblage is attained, and the grade of the mass-production is increased remarkably. In addition, the number of parts may be reduced in comparison with a conventional assemblage by assembling the parts into a single molded component, thus attaining the excellent desired characteristics securely.

In this embodiment, as shown in FIGS. 43 to 47, the ink supply member 600 has an upper surface portion 603 which forms a slit S (see FIG. 44) with respect to an end portion 4008 of the roof portion of the ink tank IT which is provided with a slit 1700 after assembly in the above manner. Another slit (not shown) similar to the slit S is formed between a lower surface portion 604 of the ink supply member 600 and a head side end portion 4011 of a thin plate member to which a lower cover 800 of the ink tank IT is joined by bonding. These slits between the ink tank IT and the ink supply member 600 not only serve to enhance the heat dissipation from the slit 1700, but also prevent undue forces applied to the ink tank IT from directly exerting on the supply member 600 or the ink jet unit IJT.

Figure 46:
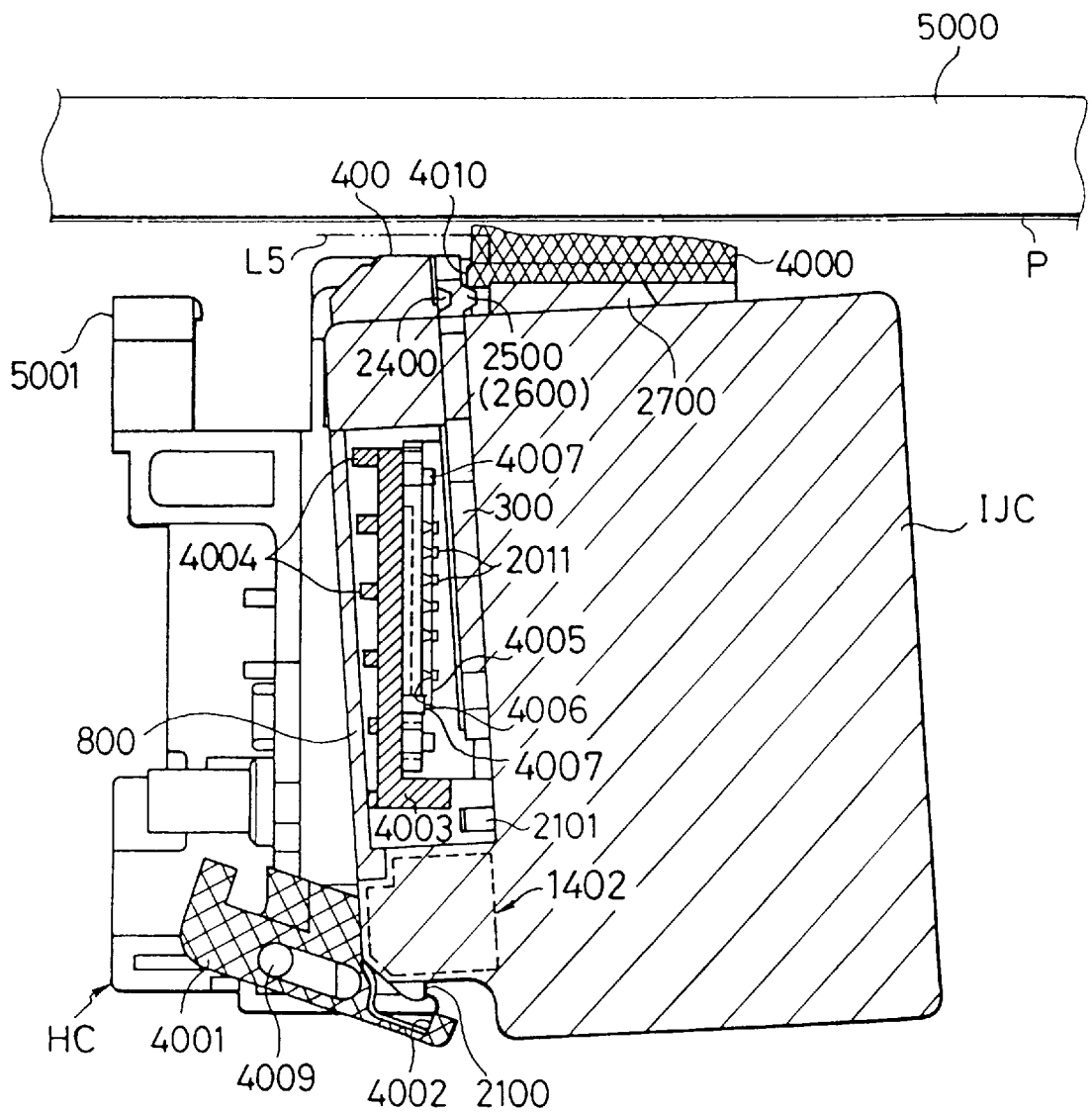
FIG. 46 is a top view showing the manner in which the ink jet cartridge is mounted on the carriage of the recording apparatus body.

Anyway, the constructions in this embodiment as mentioned above are unprecedented, and each of them produces marked effects independently, and when combined with one another, brings about organized effects because of its constituent elements (iii) Mounting of the ink jet cartridge IJC to the carriage HC In FIG. 46, reference numeral 5000 denotes a platen roller for guiding a recording medium P from a lower side of the drawing to its upper side. The carriage HC moves along the platen roller 5000. Therefore, the carriage HC has a front plate 4000 (with a thickness of 2 mm) in front of the ink jet cartridge IJC on the forward side facing the platen roller 5000. The carriage HC also has a flexible sheet 4005 provided with pads 2011 corresponding to pads 1201 on the wiring substrate 1250 of the cartridge IJC; a support board 4003 for electrical connection which supports a rubber pad sheet 4007 for generating an elastic force for pressing the reverse side of the flexible sheet 4005 onto the pads 2011; and a positioning hook 4001 for holding the IJC at the recording position. The front plate 4000 has two locating protruding surfaces 4010 corresponding to the aforementioned locating protrusions 2500 and 2600 of the support member 350. The locating protruding surface 4010 receives a vertical pressure heading for the surface 4010 after the cartridge IJC is mounted in the carriage HC. Hence, the front plate 4000 has a plurality of reinforcing ribs (not shown) elongating in the direction of opposing the vertical pressure on the side of the platen roller 5000. The ribs also form a head for protecting protrusion which is slightly closer by about 0.1 mm to the platen roller 5000 than the position of the front surface, $L_5$, of the cartridge IJC when mounted. The support plate 4003 for electrical connection has a plurality of reinforcing ribs 4004 elongating in the vertical direction to the elongating direction of the above-mentioned reinforcing ribs of the front plate 4000. The amount of the protrusion of the ribs 4004 is gradually decreased along the direction from the platen roller 5000 side to the hook 4001 side. This configuration of the ribs 4004 also enables the cartridge IJC to be positioned inclinatorily when mounted, as shown in FIG. 46. The support plate 4003 has the locating surface 4006 on the hook side in order to stabilize electrical connection. The locating surface 4006 corresponds to the above-mentioned protruding surface 4010 and exerts a force on the cartridge in a direction opposite to the direction in which the locating protruding surface 4010 exert on the cartridge. The locating surface also has a pad contact region defined therebetween, and prescribe the amount of deformation of the pads of the padded rubber sheet 4007 corresponding to the pad 2011. Once the cartridge IJC is fixed in the recording position, the locating surface 4006 contacts with the surface of the wiring substrate 350. Moreover, in this embodiment, the pads 201 of the wiring substrate 350 are arranged symmetrically with respect to the line $L_1$. Therefore, the amount of deformation of the pads on the rubber sheet 4007 is made uniform, and a contact pressure between the pads 2011 and 201 is more stabilized. In this embodiment, the pads 201 are arranged in an array with 2 center rows, with 2 upper columns and with 2 lower columns.

The hook 4001 has a slot engaging with an fixing shaft 4009. The hook 4001 is rotated counterclockwise from the position shown in the drawing by use of a movable space defined by the slot, and then moved leftward in parallel to the platen roller 5000, thereby locating the ink jet cartridge IJC on the carriage HC. Although any means may be used to move the hook 4001 in the above manner, a movement mechanism with a lever or the like is preferable. Anyway, the cartridge IJC moves to the platen roller side in response to the rotating movement of the hook 4001, and at the same time, the locating protrusions 2500 and 2600 move to the position where they can come into contact with the locating surface 4010 of the front plate. Upon the leftward movement of the hook 4001, the hook surface 4002 with an angle of 90° to the hook 4001 closely contacts with the surface with an angle of 90° to the click 2100 of the cartridge IJC. At the same time, the cartridge IJC is rotated on a horizontal plane about the region of contacting the locating surfaces 2500 and 4010. As a result, the pads 201 and 2011 begin to contact each other. When the hook 4001 is held in a predetermined position or a fixed position, a perfect contact between the pads 201 and 2011, a perfect facial contact between the positioning surfaces 2500 and 4010, a two-surface contact between the surface 4002 with an angle of 90° to the hook and the surface with an angle of 90° to the click 2100, and a facial contact between the wiring substrate 350 and the positioning surface 4006 are formed. Thus, the mounting of the cartridge IJC on the carriage HC is completed.

(iv) Outline of the apparatus body

Figure 47:
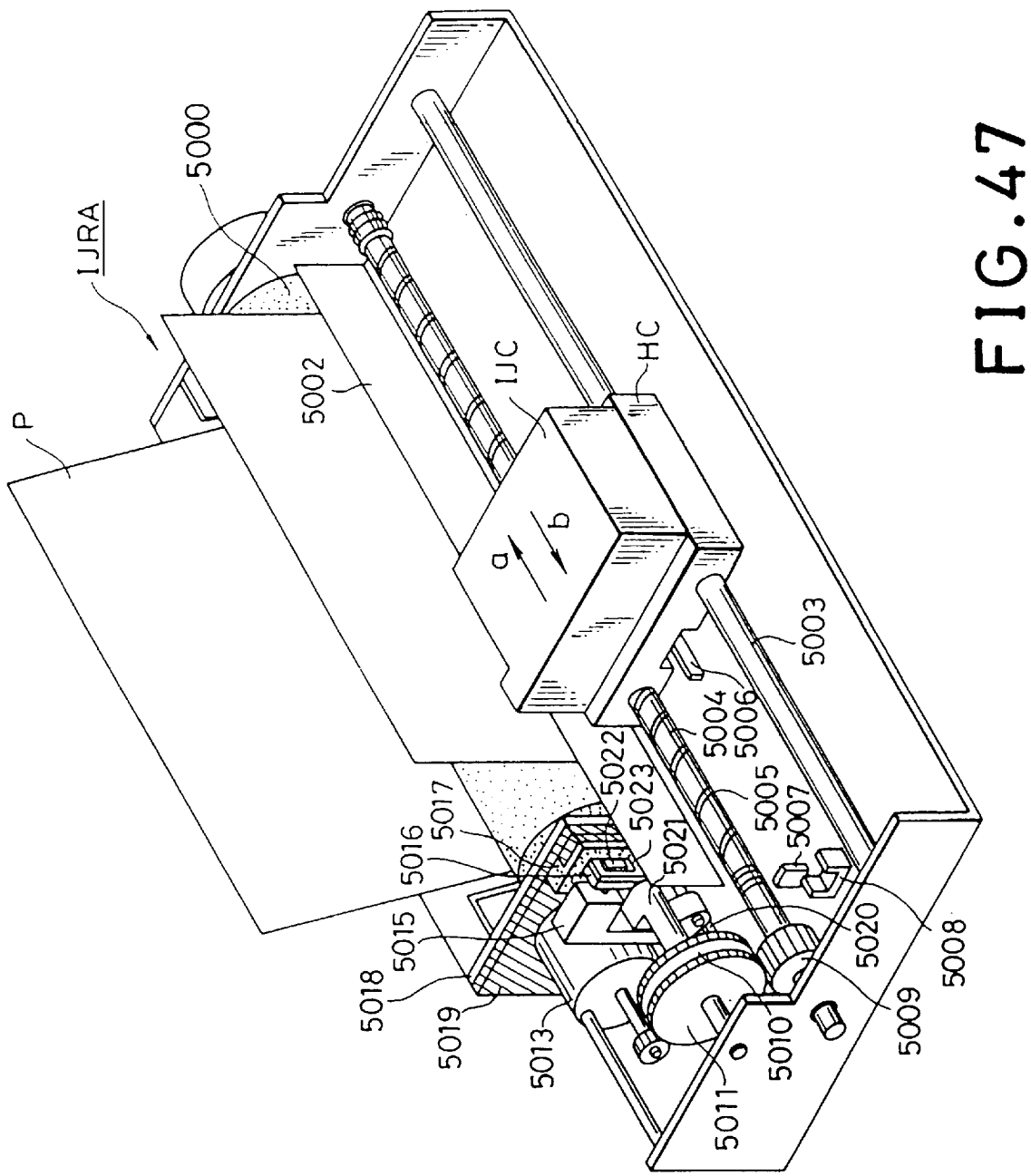
FIG. 47 is a perspective view showing an ink jet recording apparatus to which the present invention has been applied.

FIG. 47 illustrates the outline of an ink jet recording apparatus IJRA to which the present invention is applied. A lead screw 5005 is rotated reversibly via gears for transmitting driving force 5011, 5009 in association with the reversible rotation of a driving motor 5013. The carriage HC meshing with a spiral groove 5004 of the lead screw 5005 has a pin (not shown) and is moved in either direction of arrow a or b. Reference numeral 5002 denotes a paper pressure plate, which presses a paper against the platen roller 5000 over a range along the moving direction of the carriage HC. Reference numerals 5007, 5008 denote photocouplers, which detects detect the presence of a lever 5006 of the carriage in the region where the photocouplers are disposed. The photocouplers serve as a means for sensing a home position for switching the direction of rotation of the motor 5013 upon sensing of such presence. Reference numeral 5016 denotes a support member for supporting a cap member 5022 which caps the front side of the recording head. Reference numeral 5015 denotes a sucking means for making the inside of the cap member 5022 negative pressure so that the ink of the recording head is absorbed through an opening 5023 within the cap member. Reference numeral 5017 denotes a cleaning blade. Reference numeral 5019 denotes a member for enabling the cleaning blade 5017 to move forward or backward. The cleaning blade 5017 and the member 5019 are supported by a plate for supporting body 5018. As for the cleaning blade 5017, it goes without saying that a well-known cleaning blade is applicable to the present invention. Reference numeral 5012 denotes a lever for starting an absorbing procedure by the sucking member 5015. The lever 5012 moves in correspondence to the movement of a cam 5020 which engages with the carriage HC so that a driving force from the driving motor 5013 is transmitted to the sucking member 5015 by a known transmission mechanism such as switching of a clutch.

These capping, cleaning and absorbing operations are so contrived that the desired operation can be performed at their corresponding positions by the action of the lead screw 5005 when the carriage has come to the region of the home position side. However, any arrangement in which the desired operation can be performed at an appropriate time is applicable to the present embodiment.

The present invention achieves distinct effects when applied to a recording head or a recording apparatus which has means for generating thermal energy such as electrothermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consists of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. Examples of the recovery system, are a capping means and a cleaning means for the recording head, and a pressure or suction means for the recording head. Examples of the preliminary auxiliary system, are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A process for producing an ink jet recording head comprising a first substrate provided with a plurality of orifices for ejecting an ink, a plurality of grooves for constituting a part of a plurality of ink passages communicating with said orifices, and an orifice containing portion having said orifices formed therein and provided at an end portion of said grooves, and a second substrate provided with a plurality of ejection energy generating elements, said ink passages being formed by aligning said first substrate with said second substrate in such a manner that said grooves correspond to said energy generating elements and joining said first substrate and said second substrate, said process comprising the steps of:

containing an opening in said orifice forming portion, said opening being recognizable against said orifices and being used for said aligning of said first substrate and said second substrate, said opening being formed at a same time of formation of said orifices in said orifice forming portion and at a predetermined distance from the orifices; and performing said aligning while observing said second substrate from said opening.

2. A precess as claimed in claim 1, wherein said ejection energy generating elements generate thermal energy to generate a bubble and the ink is ejected accompanied by generating said bubble.

3. A process as claimed in claim 1, wherein said ink jet recording head accommodates ink to be ejected from said orifices.

4. A process as claimed in claim 1, wherein said opening is provided in the neighborhood of said plurality of orifices.

5. A process as claimed in claim 1, wherein said second substrate is combined with said first substrate in a pressed state.

6. A process as claimed in claim 1, wherein said orifices and said opening are formed with an ultraviolet laser beam irradiation.

7. A process as claimed in claim 1, wherein said first substrate comprises a resin.

* * * * *

UNITED STATES PATENT AND TRADEMARK OFFICE
CERTIFICATE OF CORRECTION

PATENT NO. : 5,930,895

DATED : August 3, 1999

INVENTOR(S) : TSUYOSHI ORIKASA ET AL.

It is certified that error appears in the above-identified patent and that said Letters Patent is hereby corrected as shown below:

<u>ON TITLE PAGE AT [56] REFERENCES CITED, FOREIGN PATENT DOCUMENTS</u>

"60-174258" should read --60-194258--.

<u>COLUMN 4</u>

Line 30, "informations" should read --information--.

<u>COLUMN 5</u>

Line 43, "tends" should read --tend--;
Line 53, "rising" should read --raising--.

<u>COLUMN 6</u>

Line 6, "setted" should read --set--;
Line 24 "INVENTIONS" should read --INVENTION--.

<u>COLUMN 7</u>

Line 6, "generated" should read --generate--;
Line 19, "each" should read --with respect to each--.

<u>COLUMN 11</u>

Line 22, "form" should read --from--.

<u>COLUMN 13</u>

Line 50, "an" should read --a--.

UNITED STATES PATENT AND TRADEMARK OFFICE
CERTIFICATE OF CORRECTION

PATENT NO. : 5,930,895

DATED : August 3, 1999

INVENTOR(S) : TSUYOSHI ORIKASA ET AL.

It is certified that error appears in the above-identified patent and that said Letters Patent is hereby corrected as shown below:

COLUMN 17

Line 66, "209d are" should read --209d, which are--.

COLUMN 21

Line 37, "views" should read --view--.

COLUMN 24

Line 42, "of" should be deleted.

COLUMN 29

Line 24, "exert" should read --exerts--;
   Line 26, "prescribe" should read --prescribes--.

COLUMN 30

Line 9, "detects" should be deleted.

COLUMN 31

Line 5, "to" should read --in--.

UNITED STATES PATENT AND TRADEMARK OFFICE
CERTIFICATE OF CORRECTION

PATENT NO. : 5,930,895
DATED : August 3, 1999
INVENTOR(S) : TSUYOSHI ORIKASA ET AL.

It is certified that error appears in the above-identified patent and that said Letters Patent is hereby corrected as shown below:

<u>COLUMN 32</u>

Line 40, "containing an opening in said orifice forming portion," should read --forming an opening in said orifice containing portion--;
Line 45, "forming" should read --containing--.

Signed and Sealed this

Twentieth Day of June, 2000

Q. TODD DICKINSON

*Attest:*

*Attesting Officer*  *Director of Patents and Trademarks*